United States Patent
Yamamoto

(10) Patent No.: US 9,727,504 B2
(45) Date of Patent: Aug. 8, 2017

(54) DATA TRANSFER APPARATUS, DATA TRANSFER METHOD, AND DATA TRANSFER PROGRAM

(71) Applicant: Kanako Yamamoto, Chiyoda-ku (JP)

(72) Inventor: Kanako Yamamoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 382 days.

(21) Appl. No.: 14/377,982

(22) PCT Filed: Feb. 4, 2013

(86) PCT No.: PCT/JP2013/052451
§ 371 (c)(1),
(2) Date: Aug. 11, 2014

(87) PCT Pub. No.: WO2013/129031
PCT Pub. Date: Sep. 6, 2013

(65) Prior Publication Data
US 2015/0039803 A1 Feb. 5, 2015

(30) Foreign Application Priority Data
Feb. 29, 2012 (JP) ................................. 2012-043994

(51) Int. Cl.
*G06F 1/12* (2006.01)
*G06F 13/14* (2006.01)
(Continued)

(52) U.S. Cl.
CPC ............... *G06F 13/28* (2013.01); *G06F 5/085* (2013.01); *G06F 12/00* (2013.01); *G06F 13/14* (2013.01)

(58) Field of Classification Search
CPC .......... G06F 13/28; G06F 5/085; G06F 12/00; G06F 1/12; G06F 13/14
See application file for complete search history.

(56) References Cited

U.S. PATENT DOCUMENTS 5,708,637 A * 1/1998 Umemura ............. G06F 3/0601
369/47.34
5,765,187 A 6/1998 Shimizu et al.
(Continued)

FOREIGN PATENT DOCUMENTS

JP 61-214047 9/1986
JP 4-308956 10/1992
(Continued)

OTHER PUBLICATIONS

Office Action issued Feb. 3, 2015 in Japanese Patent Application No. 2014-502088 (with English language translation).
(Continued)

*Primary Examiner* — Henry Tsai
*Assistant Examiner* — Christopher A Daley
(74) *Attorney, Agent, or Firm* — Oblon, McClelland, Maier & Neustadt, L.L.P.

(57) ABSTRACT

An object of the present invention is to prevent occurrence of data destruction when a transfer source region and a transfer destination region of data overlap with each other and even when transfer is performed using a burst transfer function. The data read from the transfer source region is temporarily written into a ring buffer, and then the data written into the ring buffer is written into the transfer source region. In this case, reading of the data from the ring buffer is controlled, based on a magnitude relation between the number of times of wrap-arounds caused by writing of the data into the ring buffer and the number of times of wrap-arounds caused by reading of the data from the ring buffer.

7 Claims, 31 Drawing Sheets

(51) Int. Cl.
*G06F 13/28* (2006.01)
*G06F 12/00* (2006.01)
*G06F 5/08* (2006.01)

(56) References Cited

U.S. PATENT DOCUMENTS

| | | | | |
|---|---|---|---|---|
| 5,983,289 | A * | 11/1999 | Ishikawa | G06F 13/28 710/22 |
| 6,311,237 | B1 | 10/2001 | Suzuki et al. | |
| 6,571,301 | B1 | 5/2003 | Nakahara | |
| 6,826,354 | B2 * | 11/2004 | Tezuka | H04L 12/5601 358/1.16 |
| 7,519,747 | B1 * | 4/2009 | Cory | G06F 5/10 710/52 |
| 7,721,018 | B2 * | 5/2010 | Rajbharti | G06F 13/28 710/22 |
| 2002/0169900 | A1 | 11/2002 | Hiji | |
| 2004/0243740 | A1 * | 12/2004 | Yamagishi | G06F 13/28 710/22 |
| 2005/0289254 | A1 * | 12/2005 | Chien | G06F 13/28 710/52 |
| 2006/0129714 | A1 | 6/2006 | Arataki et al. | |
| 2006/0149866 | A1 * | 7/2006 | Arataki | G06F 3/0613 710/52 |
| 2007/0204076 | A1 * | 8/2007 | Arulambalam | G06F 13/28 710/35 |
| 2008/0077716 | A1 * | 3/2008 | Sawai | G06F 13/28 710/23 |
| 2008/0228991 | A1 * | 9/2008 | Ferroussat | G06F 13/28 711/100 |
| 2009/0248911 | A1 * | 10/2009 | Conroy | G06F 1/12 710/25 |
| 2012/0233372 | A1 * | 9/2012 | Ohta | G06F 13/28 710/308 |

FOREIGN PATENT DOCUMENTS

| | | |
|---|---|---|
| JP | 8-292874 | 11/1996 |
| JP | 10-116245 | 5/1998 |
| JP | 11-194920 | 7/1999 |
| JP | 2000-76841 | 3/2000 |
| JP | 2000-293480 | 10/2000 |
| JP | 2001-142841 | 5/2001 |
| JP | 2001-325121 | 11/2001 |
| JP | 2002-342262 | 11/2002 |
| JP | 2006-190257 | 7/2006 |
| JP | 2008-83911 | 4/2008 |

OTHER PUBLICATIONS

International Search Report issued Mar. 5, 2013, in PCT/JP13/052451 filed Feb. 4, 2013.
Combined Office Action and Search Report issued Apr. 21, 2015 in Taiwanese Patent Application No. 102106366 (with English translation of relevant portions).

* cited by examiner

WHEN SHIFTED IN FORWARD DIRECTION

WHEN SHIFTED IN BACKWARD DIRECTION

DATA TRANSFER APPARATUS, DATA TRANSFER METHOD, AND DATA TRANSFER PROGRAM

TECHNICAL FIELD

The present invention relates to a data transfer technology for transferring data stored in a transfer source region to a transfer destination region.

BACKGROUND ART

Among data transfer technologies, there is provided a technology referred to as a DMA (Direct Memory Access) transfer.

In the DMA transfer, a CPU (Central Processing Unit) first sets DMA information such as a data transfer source address, a data transfer destination address, a data transfer size necessary for the transfer in a register in a DMA transfer control apparatus. Then, when the CPU instructs start of the transfer to the DMA transfer control apparatus, the DMA transfer control apparatus executes a transfer process according to the DMA information set in the register. The DMA transfer control apparatus asserts a DMA transfer completion interrupt to the CPU when the transfer of data corresponding to the transfer size set in the register is completed. When the CPU detects the DMA transfer completion interrupt, the CPU reads the information in the register of the DMA transfer control apparatus to check a result or a status of the DMA transfer.

It is not necessary to perform transfer control by the CPU during execution of the transfer process by the DMA transfer control apparatus. Consequently, the data transfer in the DMA transfer may be performed at higher speed than in a case where the data transfer is performed via the CPU. Further, a burden on the CPU may be reduced in the DMA transfer.

In the DMA transfer in general, reading of data necessary for each set size (unit amount) is performed, and subsequent writing of the data is performed. Since a timing of starting the writing is after completion of the reading, transfer efficiency is not good in a transfer to a device with a large latency.

There is provided a DMA transfer control apparatus using an AXI (Advanced eXtensible Interface) bus.

The AXI bus includes a read-only bus and a write-only bus, so that data acquisition from a data transfer source region using the read-only bus and data transfer to a data transfer destination region using the write-only bus may be executed in parallel.

The AXI bus includes a burst transfer function. The burst transfer function is a function whereby a plurality of unit amounts of read data may be obtained by a one-time read request, and a plurality of unit amounts of writes may be executed by a one-time write request.

The DMA transfer control apparatus using the AXI bus may perform transfer at high speed by using the read-only/write-only buses and the burst transfer function.

CITATION LIST

Patent Literature

Patent Literature 1: JP H10-116245
Patent Literature 2: JP 2008-83911

SUMMARY OF INVENTION

Technical Problem

When a transfer source region and a transfer destination region of data over with each other in the DMA transfer, data destruction may occur. Especially when the transfer is performed using the burst transfer function, it is difficult to prevent data destruction.

An object of the present invention is to prevent occurrence of data destruction when a transfer source region and a transfer destination region of data overlap with each other. In particular, an object of the present invention is to prevent occurrence of data destruction even when transfer is performed using a burst transfer function.

Solution to Problem

A data transfer apparatus according to the present invention is a data transfer apparatus that transfers data stored in a transfer source region to a transfer destination region. The data transfer apparatus may include:

a transfer source read control unit that outputs a read command for reading the data stored in the transfer source region;

a buffer write control unit that obtains the data read by the read command output by the transfer source read control unit and writes the data into a ring buffer;

a buffer read control unit that reads the data written by the buffer write control unit from the ring buffer and transmits the data to the transfer destination region;

a transfer destination write control unit that outputs a write command for writing, into the transfer destination region, the data transmitted to the transfer destination region by the buffer read control unit;

a write cycle counting unit that counts the number of times of wrap-arounds by the buffer write control unit;

a read cycle counting unit that counts the number of times of wrap-arounds by the buffer read control unit; and a data non-destructive control unit that determines whether or not to permit writing of the data to the transfer destination region, based on a magnitude relation between the number of times counted by the write cycle counting unit and the number of times counted by the read cycle counting unit;

wherein the buffer read control unit reads the data from the ring buffer when the data non-destructive control unit determines to permit writing; and wherein when the data non-destructive control unit determines to permit writing, the transfer destination write control unit outputs the write command to write, into the transfer destination region, the data transmitted to the transfer destination region by the buffer read control unit.

Advantageous Effects of Invention

According to the data transfer apparatus of the present invention, by adjusting a timing of reading data from a buffer region, occurrence of data destruction may be prevented.

DESCRIPTION OF EMBODIMENTS

First Embodiment

Figure 1:
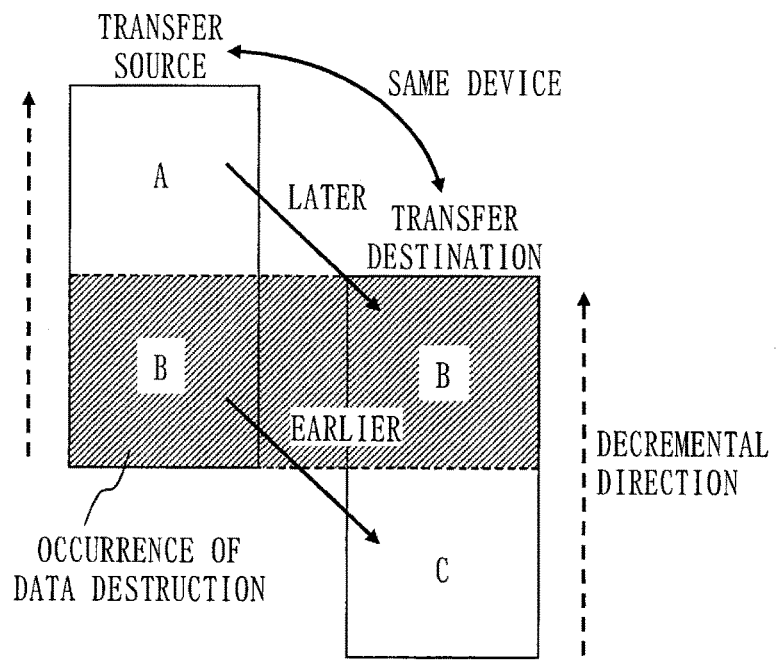
FIG. 1 is an explanatory diagram when data destruction occurs.
Figure 2:
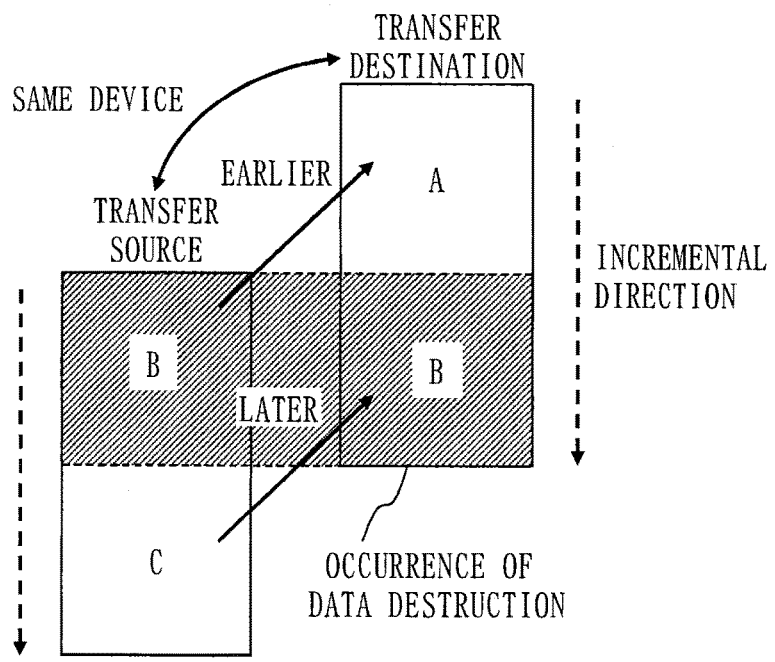
FIG. 2 is an explanatory diagram when data destruction occurs.

FIGS. 1 and 2 are each an explanatory diagram when data destruction occurs. FIG. 1, in particular, is the explanatory diagram when a transfer source region and a transfer destination region of data are shifted in a forward direction. FIG. 2 is the explanatory diagram when a transfer source region and a transfer destination region of data are shifted in a backward direction.

Based on FIG. 1, a description will be made about a case where the transfer source region and the transfer destination region of the data are shifted in the forward direction while the transfer source region and the transfer destination region of the data partly overlap with each other. When the address value of a start address for the transfer source region is smaller than the address value of a start address for the transfer destination region, the transfer source region and the transfer destination region are shifted in the forward direction.

Referring to FIG. 1, the transfer source region and the transfer destination region are regions in a same device, with a region B overlapped between the transfer source region and the transfer destination region. Further, referring to FIG. 1, the address value of a start address for a region A, which is the start address for the transfer source region, is smaller than the address value of a start address for the region B, which is the start address for the transfer destination region. The transfer source region and the transfer destination region are therefore shifted in the forward direction.

When data transfer is sequentially performed in the ascending direction (incremental direction) of address values in this case, data in the region A is first written into the region B. Then, the data in the region B is written into a region C. In this case, before the data in the region B is written into the region C, the data in the region A is written into the region B. Thus, data originally stored in the region B is destroyed.

Then, the data transfer is sequentially performed in the descending direction (decremental direction) of the address values in this case. Then, the data in the region B is first written into the region C. The data in the region A is subsequently written into the region B. Consequently, the transfer may be performed without destroying the data.

Based on FIG. 2, a description will be made about a case where the transfer source region and the transfer destination region of the data are shifted in the backward direction while the transfer source region and the transfer destination region of the data partly overlap with each other. When the address value of a start address for the transfer source region is larger than the address value of a start address for the transfer destination region, the transfer source region and the transfer destination region are shifted in the backward direction.

Referring to FIG. 2 as well, the transfer source region and the transfer destination region are regions in the same device, with the region B overwrapped between the transfer source region and the transfer destination region, as in FIG.

1. Referring to FIG. 2, however, the address value of a start address for the region B, which is the start address for the transfer source region, is larger than the address value of a start address for the region A, which is the start address for the transfer destination region. The transfer source region and the transfer destination region are therefore shifted in the backward direction.

When data transfer is sequentially performed in the descending direction (decremental direction) of address values in this case, data in the region C is first written into the region B. Then, the data in the region B is written into the region A. In this case, before the data in the region B is written into the region A, the data in the region C is written into the region B. Thus, data originally stored in the region B is destroyed.

Then, the data transfer is sequentially performed in the ascending direction (incremental direction) of the address values in this case. Then, the data in the region B is first written into the region A. The data in the region C is subsequently written into the region B. Consequently, the transfer may be performed without destroying the data.

In short, when the transfer source region and the transfer destination region are shifted in the forward direction and the decremental transfer of sequentially transferring the data in the descending direction of the address values is performed, data destruction does not occur. On the other hand, when the transfer source region and the transfer destination region are shifted in the backward direction and the incremental transfer of sequentially transferring the data in the ascending direction of the address values is performed, data destruction does not occur.

Figure 3:
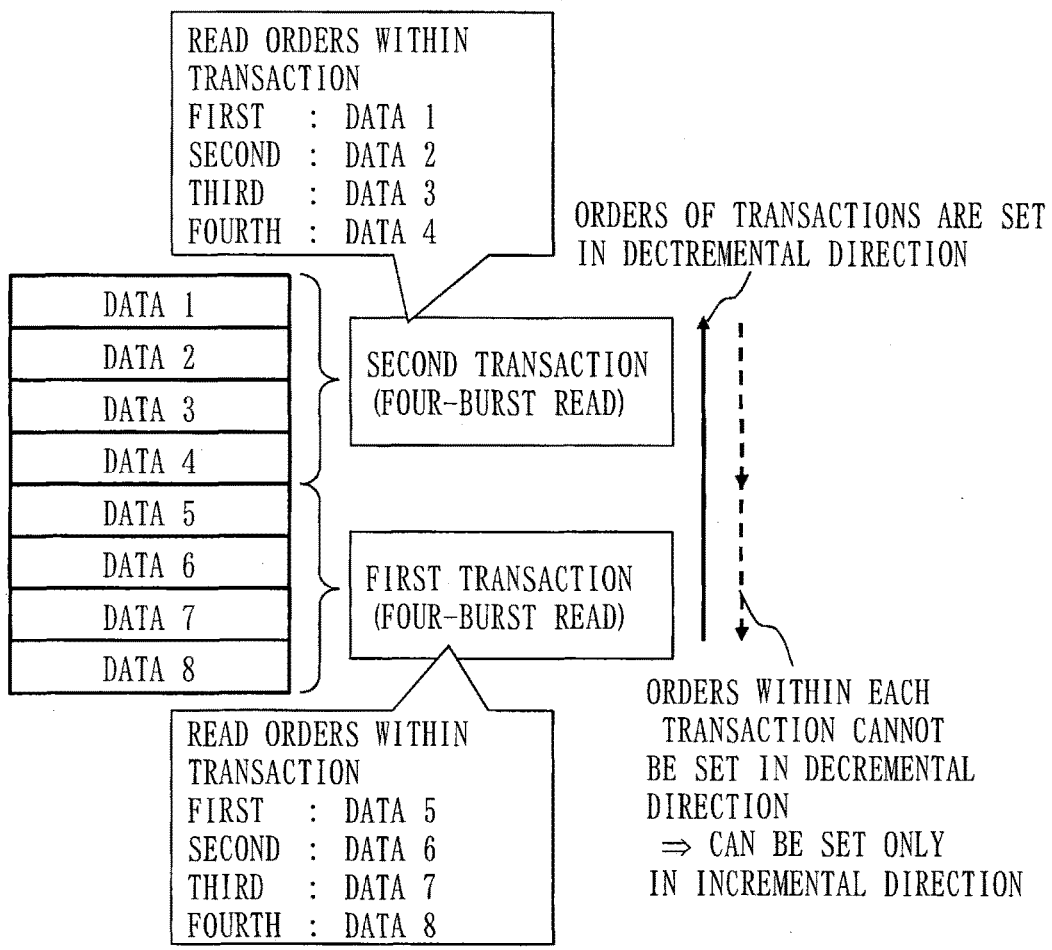
FIG. 3 is a diagram explaining orders in which data transfers are performed when a burst transfer function is used.

FIG. 3 is a diagram explaining orders in which data transfers are performed when a burst transfer function is used. FIG. 3 shows a case where the data transfers in the decremental direction are performed, using the burst transfer function.

In a usual data transfer, only one unit amount of data may be transferred by a one-time read/write request. On contrast therewith, when the burst transfer function is used, a plurality of unit amounts of data may be transferred by a one-time read/write request.

Referring to FIG. 3, it is assumed that eight unit amounts of data 1 to 8 are transferred. Consequently, in the usual data transfer, eight times of read/write requests are needed. On contrast therewith, when the burst transfer function is used, the transfer may be performed using twice of read/write requests. A four-burst transfer is assumed herein in which four units of data may be transferred by a one-time read/write request.

Herein, burst read commands (transactions) may be issued both in the decremental direction and the incremental direction. However, data specified in each burst read command may be read only in the incremental direction. Consequently, as shown in FIG. 3, even if a four-burst read command of reading the data 5 to 8 is firstly issued and then a four-burst read command of reading the data 1 to 4 is secondly issued in the decremental direction, the data are read in the order of the data 5, 6, 7, 8, 1, 2, 3, and 4. That is, the data cannot be read in the order of the data 8, 7, 6, 5, 4, 3, 2, and 1.

Accordingly, when a transfer source region and a transfer destination region are shifted in the forward direction and data transfer is performed using the burst transfer function, data destruction cannot be prevented even if the decremental transfer is employed.

In the case of a burst write command as well, burst write commands may also be issued both in the incremental direction and the decremental direction, as in the case of the burst read command. However, data specified in each burst write command may be written only in the incremental direction.

Figure 4:
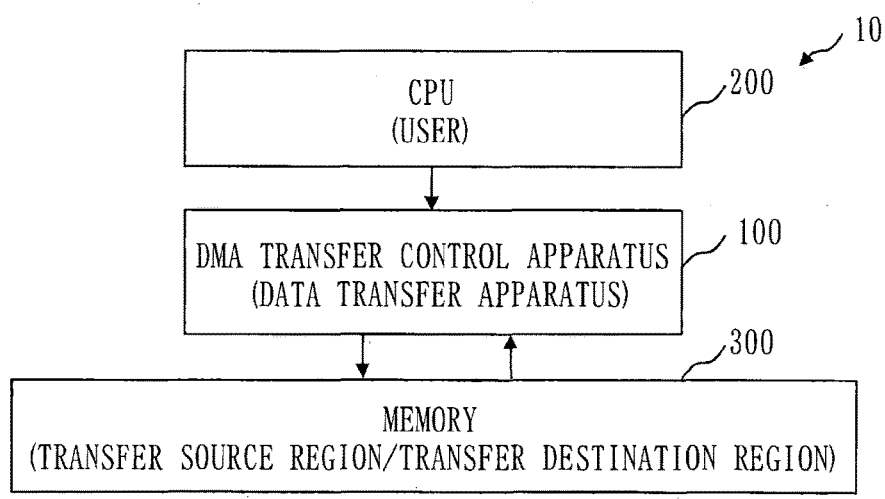
FIG. 4 is a diagram showing a configuration of a DMA transfer system 10 according to a first embodiment.

FIG. 4 is a diagram showing a configuration of a DMA transfer system 10 according to a first embodiment.

The DMA transfer system 10 includes a DMA transfer control apparatus 100 (data transfer apparatus), a CPU 200, and a memory 300

The DMA transfer control apparatus 100 is an apparatus that accesses the memory 300 and performs data transfer, according to DMA information set in registers by a user of the CPU 200 or the like.

The CPU 200 sets the DMA information such as a transfer source address that specifies a transfer source region, a transfer destination address that specifies a transfer destination region, a transfer size that specifies the size of data to be transferred, and the type of transfer (such as the incremental transfer or the decremental transfer) in the registers of the DMA transfer control apparatus 100, and causes the DMA transfer control apparatus 100 to execute the transfer of the data. It is assumed herein that the CPU 200 sets the DMA information. An apparatus or a system other than the CPU 200 may set the DMA information.

The memory 300 is a target resource that will serve as the transfer source region and the transfer destination region of the data transfer.

Figure 5:
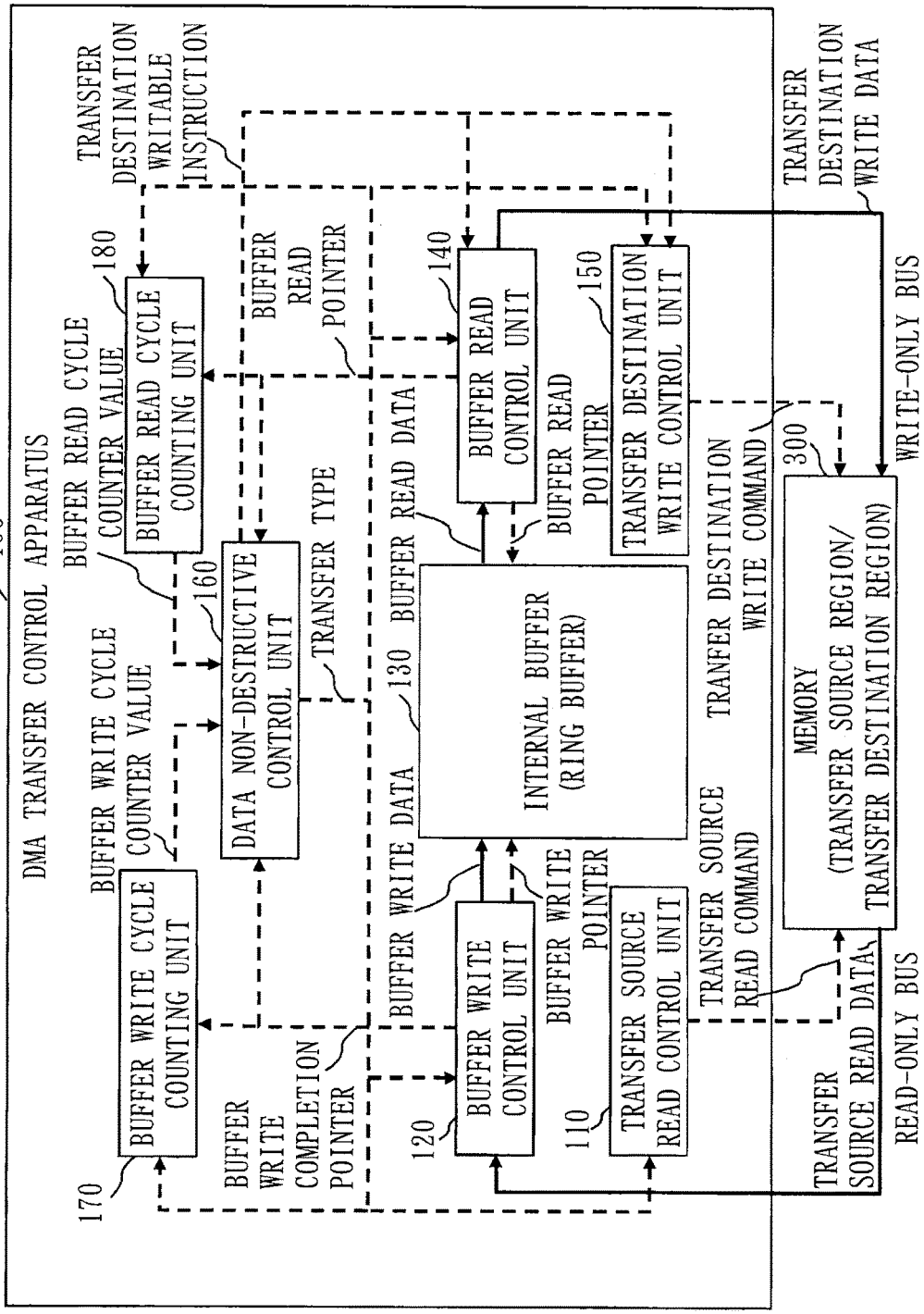
FIG. 5 is a diagram showing a configuration of a DMA transfer control apparatus 100 according to the first embodiment.

FIG. 5 is a diagram showing a configuration of the DMA transfer control apparatus 100 according to the first embodiment.

Referring to FIG. 5, a solid line indicates a data line through which data flows, and a broken line indicates a control line through which a control signal flows.

The DMA transfer control apparatus 100 includes a transfer source read control unit 110, a buffer write control unit 120, an internal buffer 130 (ring buffer), a buffer read control unit 140, a transfer destination write control unit 150, a data non-destructive control unit 160, a buffer write cycle counting unit 170, and a buffer read cycle counting unit 180.

The transfer source read control unit 110 outputs to the memory 300 a transfer source read command for reading the data stored in the transfer source region of the memory 300.

The transfer source read command is information that collects information of a read address, a read address effective signal (or a read request signal), and other signals (indicating a burst size and a burst length).

The buffer write control unit 120 obtains the data read from the transfer source according to the transfer source read command output by the transfer source read control unit 110 through a read-only bus.

The buffer write control unit 120 outputs the obtained data read from the transfer source to the internal buffer 130 as buffer write data, and writes the buffer write data into a position of the internal buffer 130 specified by a buffer write pointer. The buffer write pointer is information indicating a current buffer write destination.

The buffer write control unit 120 notifies the data non-destructive control unit 160 of a position where writing of the buffer write data has been completed, as a buffer write completion pointer. In other words, the buffer write completion pointer is information indicating a completion region where preparation for reading from the internal buffer 130 has been completed.

The internal buffer 130 is a resource included in the DMA transfer control apparatus 100, for storage of the data to be transferred.

The buffer read control unit 140 reads the data from a position of the internal buffer 130 specified by a buffer read pointer, as buffer read data. The buffer read pointer is information indicating a current buffer read destination.

The buffer read control unit 140 outputs the read buffer read data to the memory 300 through a write-only bus as write data for a transfer destination.

The buffer read control unit 140 notifies the data non-destructive control unit 160 of the buffer read pointer.

The transfer destination write control unit 150 outputs a transfer destination write command to the memory 300 to write the write data for the transfer destination output by the buffer read control unit 140 into the transfer destination region.

The transfer destination write command is information that collects information of a write address, a write address effective signal (or a write request signal), a write data effective signal, and other signals (indicating a burst size, a burst length, and a strobe signal).

The data non-destructive control unit 160 notifies respective control units and respective counting units of the type of transfer (incremental transfer or decremental transfer) set by the CPU 200. The respective control units refer to the transfer source read control unit 110, the buffer write control unit 120, the buffer read control unit 140, and the transfer destination write control unit 150. The respective counting units refer to the buffer write cycle counting unit 170 and the buffer read cycle counting unit 180.

In the case of the decremental transfer, the data non-destructive control unit 160 determines whether or not preparation for reading the data at the position indicated by the buffer read pointer has been completed, based on a "magnitude relation between the number of times of wrap-arounds (buffer write cycle counter value) counted by the buffer write cycle counting unit 170 and the number of times of wrap-arounds (buffer read cycle counter value) counted by the buffer read cycle counting unit 180" and a "magnitude relation between the value of the buffer write completion pointer and the value of the buffer read pointer". Then, when the data non-destructive control unit 160 determines that the preparation for reading the data has been completed, the data non-destructive control unit 160 outputs a transfer destination writable instruction to the buffer read control unit 140 and the transfer destination write control unit 150. In the case of the incremental transfer, the data non-destructive control unit 160 constantly outputs the transfer destination writable instruction, irrespective of the buffer write completion pointer and the buffer read pointer.

Upon receipt of the transfer destination writable instruction from the data non-destructive control unit 160, the buffer read control unit 140 reads the data from the internal buffer 130. Upon receipt of the transfer destination writable instruction from the data non-destructive control unit 160, the transfer destination write control unit 150 outputs the transfer destination write command.

The buffer write cycle counting unit 170 is a counter that counts the number of times of wrap-arounds of the buffer write completion pointer, in the case of the decremental transfer.

The buffer read cycle counting unit 180 is a counter that counts the number of times of wrap-arounds of the buffer read pointer, in the case of the decremental transfer.

The read-only bus is a bus that flows the transfer source read command and the read data from the transfer source. The write-only bus is a bus that flows the transfer destination write command and the write data for the transfer destination. The read-only bus and the write-only bus are not dependent to each other, and may be operated in parallel.

Figure 6:
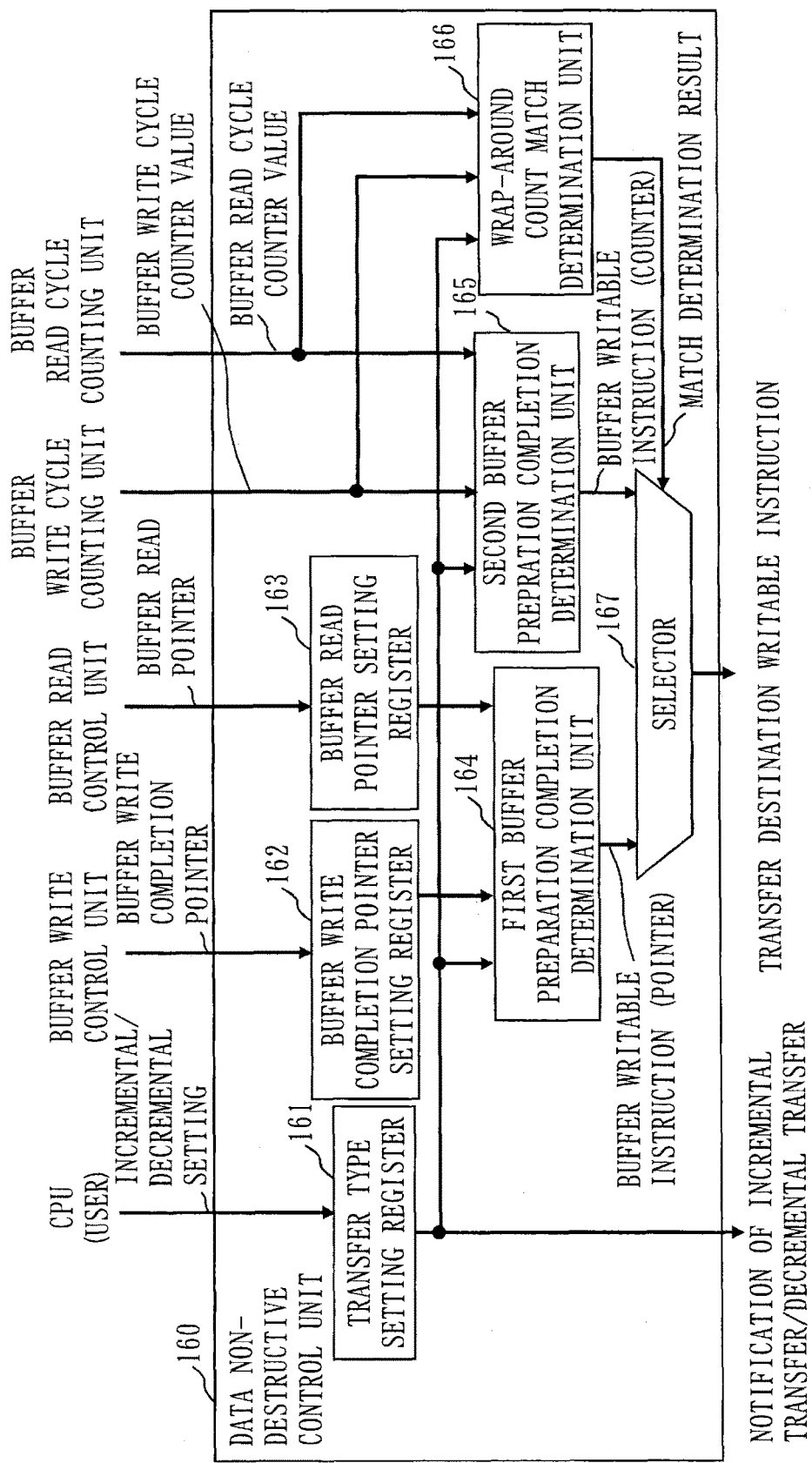
FIG. 6 is a diagram showing a configuration of a data non-destructive control unit 160 according to the first embodiment.

FIG. 6 is a diagram showing a configuration of the data non-destructive control unit 160 according to the first embodiment.

The data non-destructive control unit 160 includes a transfer type setting register 161, a buffer write completion pointer setting register 162, a buffer read pointer setting register 163, a first buffer preparation completion determination unit 164, a second buffer preparation completion determination unit 165, a wrap-around count match determination unit 166, and a selector 167.

The type of transfer is set in the transfer type setting register 161 by the CPU 200. The type of transfer set in the transfer type setting register 161 is notified from the data non-destructive control unit 160 to each control unit.

The buffer write completion pointer notified from the buffer write control unit 120 is set in the buffer write completion pointer setting register 162.

The buffer read pointer notified from the buffer read control unit 140 is set in the buffer read pointer setting register 163.

The first buffer preparation completion determination unit 164 determines whether or not the preparation for reading the data from the internal buffer 130 has been completed, based on the type of transfer, the buffer write completion pointer, and the buffer read pointer. When the first buffer preparation completion determination unit 164 determines that the preparation for reading the data has been completed, the first buffer preparation completion determination unit determines that data destruction will not occur, and then outputs a transfer destination writable instruction (pointer) to the selector 167.

The second buffer preparation completion unit 165 determines whether or not the preparation for reading the data from the internal buffer 130 has been completed, based on a buffer write cycle counter value obtained from the buffer write cycle counting unit 170 and a buffer read cycle counter value obtained from the buffer read cycle counting unit 180. When the second buffer preparation completion unit 165 determines that the preparation for reading the data has been completed, the second buffer preparation completion unit 165 determines that data destruction will not occur, and then outputs a transfer destination writable instruction (counter) to the selector 167.

The wrap-around count match determination unit 166 determines whether or not the buffer write cycle counter value obtained from the buffer write cycle counting unit 170 and the buffer read cycle counter value obtained from the buffer read cycle counting unit 180 match.

The selector 167 selects one of the transfer destination writable instruction (pointer) output from the first buffer preparation completion determination unit 164 and the transfer destination writable instruction (counter) output from the second buffer preparation completion determination unit 165 is to be output as the transfer destination writable instruction, based on a result of determination by the wrap-around count match determination unit 166. The selector 167 outputs the selected transfer destination writable instruction to the buffer read control unit 140 and the transfer destination write control unit 150.

Figure 7:
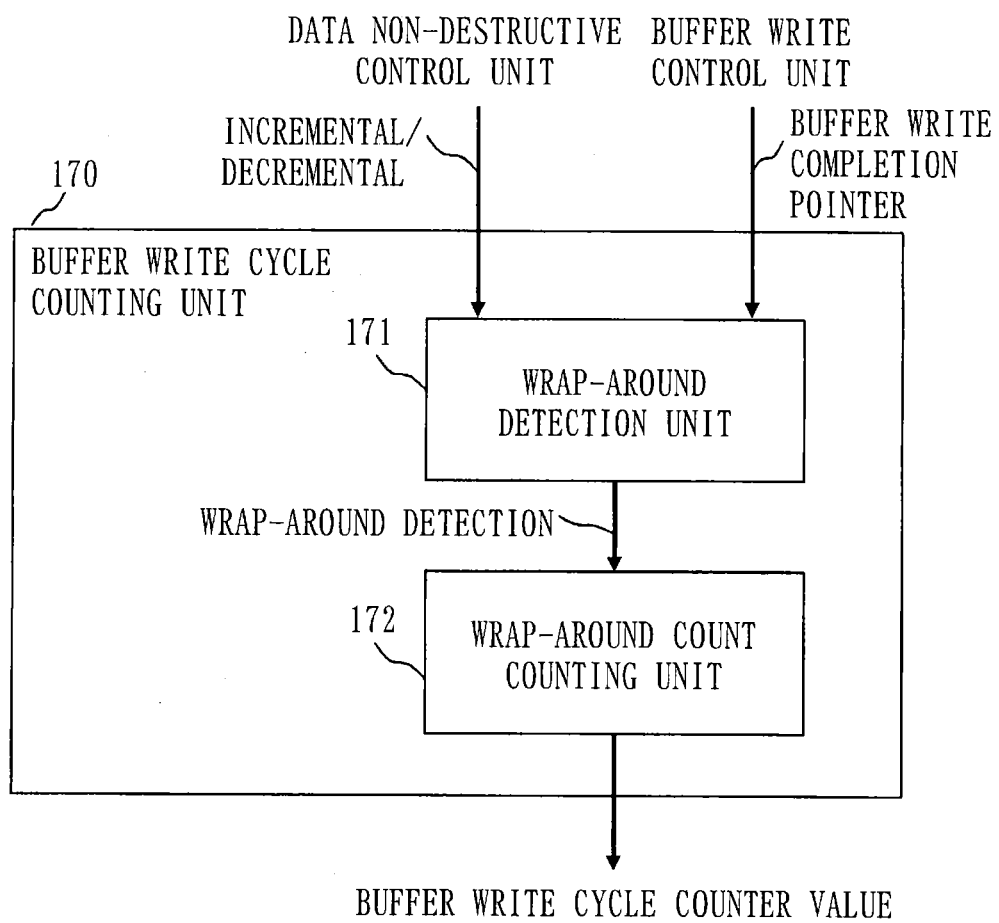
FIG. 7 is a diagram showing a configuration of a buffer write cycle counting unit 170 according to the first embodiment.

FIG. 7 is a diagram showing a configuration of the buffer write cycle counting unit 170 according to the first embodiment.

The buffer write cycle counting unit 170 includes a wrap-around detection unit 171 and a wrap-around count counting unit 172.

In the case of the decremental transfer, the wrap-around detection unit 171 detects whether or not the buffer write completion pointer has wrapped around.

When the wrap-around detection unit 171 detects a wrap-around, the wrap-around count counting unit 172 counts up a buffer write cycle counter value by one. Then, the wrap-around count counting unit 172 outputs the counted-up buffer write cycle counter value to the data non-destructive control unit 160.

Figure 8:
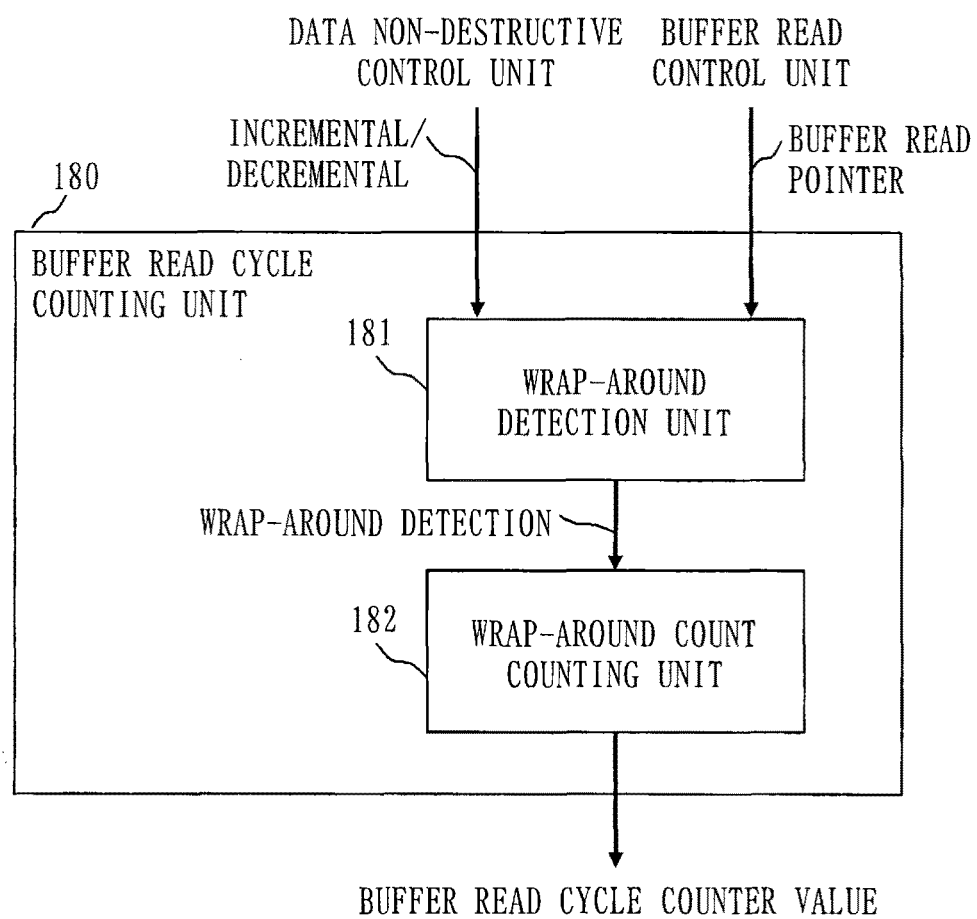
FIG. 8 is a diagram showing a configuration of a buffer read cycle counting unit 180 according to the first embodiment.

FIG. 8 is a diagram showing a configuration of the buffer read cycle counting unit 180 according to the first embodiment.

The buffer read cycle counting unit 180 includes a wrap-around detection unit 181 and a wrap-around count counting unit 182.

In the case of the decremental transfer, the wrap-around detection unit 181 detects whether or not the buffer read pointer has wrapped around.

When the wrap-around detection unit 181 detects a wrap-around, the wrap-around count counting unit 182 counts up a buffer read cycle counter value by 1. Then, the wrap-around count counting unit 182 outputs the counted-up buffer read cycle counter value to the data non-destructive control unit 160.

Next, a description will be made about operations of the DMA transfer control apparatus 100.

Figure 9:
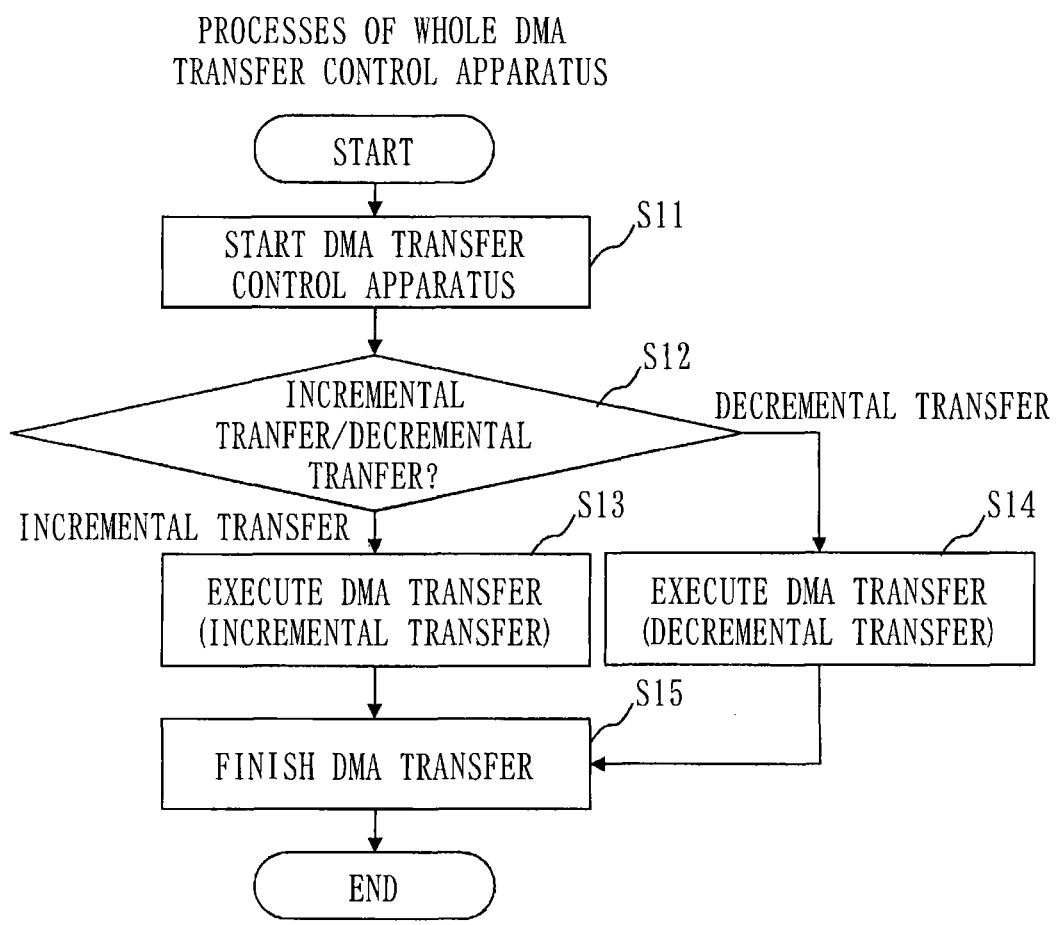
FIG. 9 is a flowchart showing operations of the whole DMA transfer control apparatus 100 according to the first embodiment.

FIG. 9 is a flowchart showing the operations of the whole DMA transfer control apparatus 100 according to the first embodiment.

In step S11, the CPU 200 sets DMA information in the registers of the DMA transfer control apparatus 100, and starts the DMA transfer control apparatus 100. Then, in step S12, the data non-destructive control unit 160 of the DMA transfer control apparatus 100 notifies each control unit of the type of transfer (incremental transfer or decremental transfer) set in the register (transfer type setting register 161). When the incremental transfer is set in the register, the DMA transfer control apparatus 100 causes the procedure to proceed to step S13. When the decremental transfer is set, the DMA transfer control apparatus 100 causes the procedure to proceed to step S14.

In step S13, the DMA transfer control apparatus 100 performs the incremental transfer with respect to the memory 300. On the other hand, in step S14, the DMA transfer control apparatus 100 performs the decremental transfer with respect to the memory 300.

Then, in step S15, when there is a DMA transfer stop factor such as completion of transfer of data having a specified data length, the DMA transfer control apparatus 100 stops the transfer operation.

Figure 10:
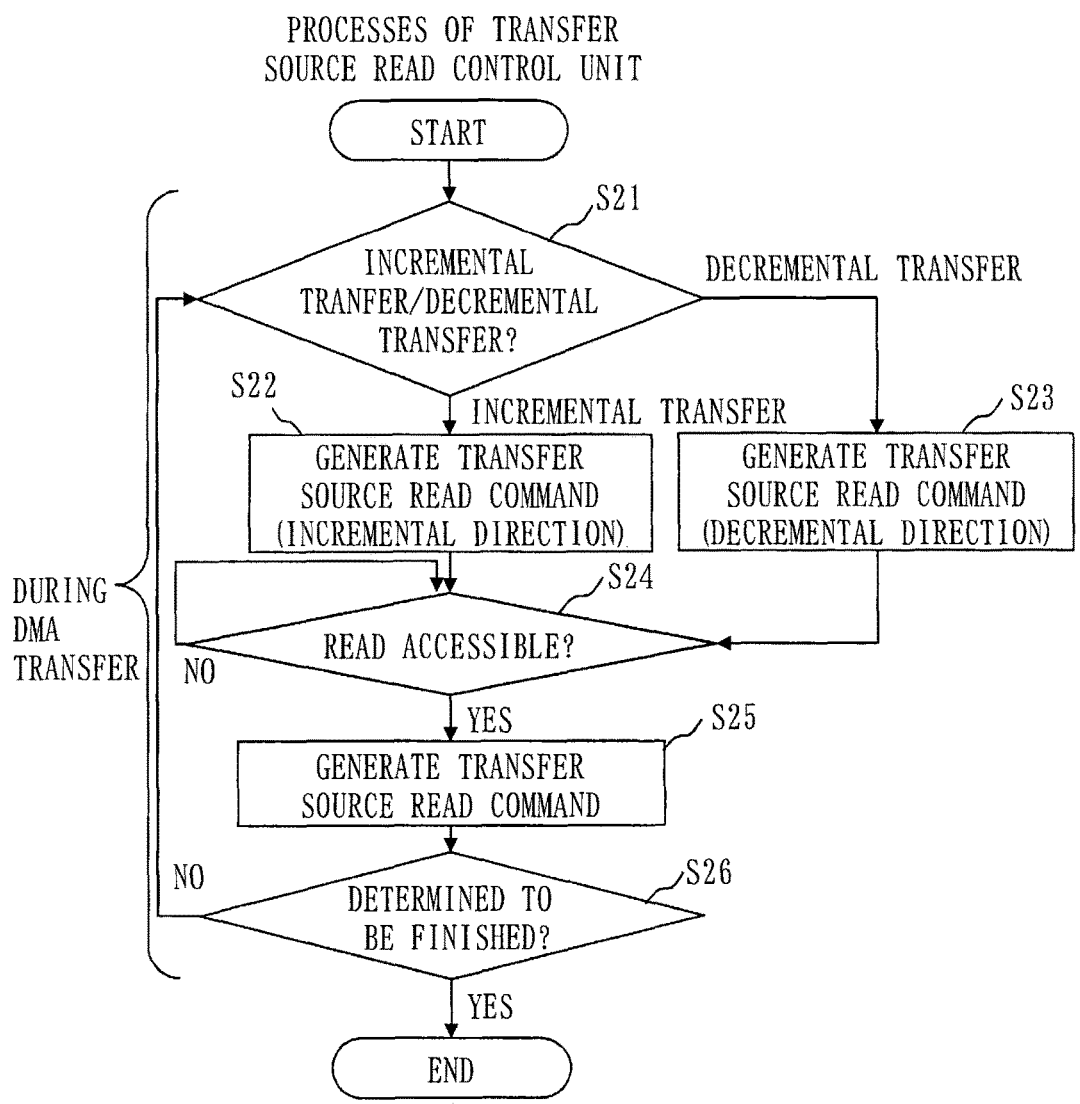
FIG. 10 is a flowchart showing operations of a transfer source read control unit 110 according to the first embodiment.

FIG. 10 is a flowchart showing operations of the transfer source read control unit 110 according to the first embodiment. FIG. 10 shows the operations of the transfer source read control unit 110 in step S13 or S14 in FIG. 9.

In step S21, the transfer source read control unit 110 determines whether the incremental transfer or the decremental transfer is to be performed, based on the type of transfer transmitted from the data non-destructive control unit 160. When the transfer source read control unit 110 determines that the incremental transfer is to be performed, the transfer source read control unit 110 causes the procedure to proceed to step S22. When the transfer source read control unit 110 determines that the decremental transfer is to be performed, the transfer source read control unit 110 causes the procedure to proceed to step S23.

In step S22 or S23, the transfer source read control unit 110 generates one burst read command, as a transfer source read command. The burst read command is a command for sequentially reading each unit amount of the data in an ascending order of address values starting at a read start address until reaching a predetermined number of unit amounts of the data, as described based on FIG. 3.

In step S24 subsequent to step S22 or S23, the transfer source read control unit 110 determines whether or not a read access is possible, depending on whether or not a free region for storing the data to be read by the transfer source read command is present in the internal buffer 130. When the transfer source read control unit 110 determines that the read access is possible (YES in step S24), the transfer source read control unit 110 causes the procedure to proceed to step S25. On the other hand, when the transfer source read control unit 110 determines that the read access is impossible (NO in step S24), the transfer source read control unit 110 returns the procedure to step S24. Then, after a lapse of a predetermined period of time, the transfer source read control unit 110 determines again whether or not the read access is possible.

In step S25, the transfer source read control unit 110 issues the generated transfer source read command to the memory 300 to read the data from a transfer source region.

Then, in step S26, the transfer source read control unit 110 determines whether or not the read access to the memory 300 is to be finished, according to whether or not the transfer source read control unit 110 has transmitted to the memory 300 one or more transfer source read commands for reading the data corresponding to the size of the transfer. When the transfer source read control unit 110 determines that the read access is to be finished (YES in step S26), the transfer source read control unit 110 finishes the procedure. On the other hand, when the transfer source read control unit 110 determines that the read access is not to be finished (NO in step S26), the transfer source read control unit 110 returns the procedure to step S21.

In step S22, the transfer source read control unit 110 generates the burst read commands in the incremental direction. That is, the transfer source read control unit 110 generates the burst read commands such that address values of read start addresses of the burst read commands are arranged in the ascending order.

On the other hand, in step S23, the transfer source read control unit 110 generates the burst read commands in the decremental direction. That is, the transfer source read control unit 110 generates the burst read commands such that the address values of the read start addresses of the burst read commands are arranged in a descending order.

Figure 11:
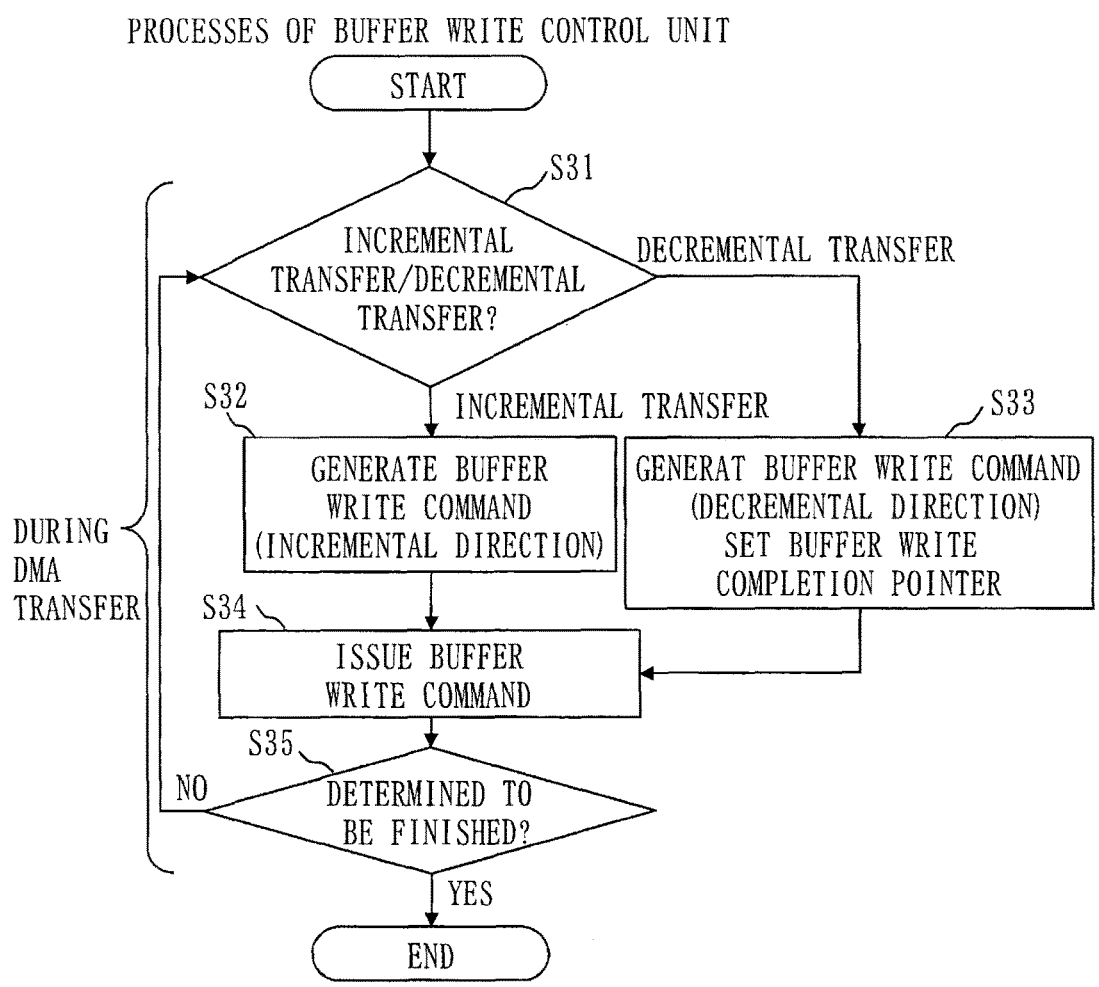
FIG. 11 is a flowchart showing operations of a buffer write control unit 120 according to the first embodiment.

FIG. 11 is a flowchart showing operations of the buffer write control unit 120 according to the first embodiment. FIG. 11 shows the operations of the buffer write control unit 120 in step S13 or S14 in FIG. 9.

In step S31, the buffer write control unit 120 determines whether the incremental transfer or the decremental transfer is to be performed, based on the type of transfer transmitted from the data non-destructive control unit 160. When the buffer write control unit 120 determines that the incremental transfer is to be performed, the buffer write control unit 120 causes the procedure to proceed to step S32. When the buffer write control unit 120 determines that the decremental transfer is to be performed, the buffer write control unit 120 causes the procedure to proceed to step S33.

In step S32 or S33, the buffer write control unit 120 generates one burst write command corresponding to one transfer source read command, as a buffer write command. This buffer write command is a command for sequentially writing the data in the ascending order of address values starting at a write start address, by using, as the write start address, the address of the internal buffer 130 associated with the read start address of the corresponding transfer source read command.

In this case, the buffer write control unit 120 obtains from the transfer source read control unit 110 information such as the read start address and the number of unit amounts of the data to be read by the transfer source read command to be issued by the transfer source read control unit 110, and generates the buffer write command corresponding to the transfer source read command. Alternatively, the buffer write control unit 120 may determine the read start address and the number of unit amounts of the data to be read by the transfer source read command to be issued by the transfer source read control unit 110, using a logic similar to that of the transfer source read control unit 110, thereby generating the buffer write command corresponding to the transfer source read command.

In step S33, the buffer write control unit 120 sets the buffer write completion pointer in the buffer write completion pointer setting register 162 of the data non-destructive control unit 160. It is assumed that the buffer write completion pointer in this case indicates an address value obtained by adding to an address value indicated by the buffer write pointer an address value corresponding to the size of the data to be written by that write command.

In step S34 subsequent to steps S32 or S33, the buffer write control unit 120 issues the buffer write command to the internal buffer 130. With this arrangement, the buffer write control unit 120 writes the data read from the transfer source region by the one transfer source read command into the internal buffer 130.

Then, in step S35, the buffer write control unit 120 determines whether or not the write access to the internal buffer 130 is to be finished, according to whether or not the buffer write control unit 120 has transmitted to the internal buffer 130 one or more buffer write commands for writing the data corresponding to the size of the transfer. When the buffer write control unit 120 determines that the write access is to be finished (YES in step S35), the buffer write control unit 120 finishes the procedure. When the buffer write control unit 120 determines that the write access is not to be finished (NO in step S35), the buffer write control unit 120 returns the procedure to step S31.

When the buffer write control unit 120 determines that the write access is to be finished (YES in step S35) in step S35, the buffer write control unit 120 sets in the buffer write completion pointer setting register 162 the write start address of the burst write command that has been finally issued, as the buffer write completion pointer. Then, the buffer write control unit 120 finishes the procedure.

Figure 12:
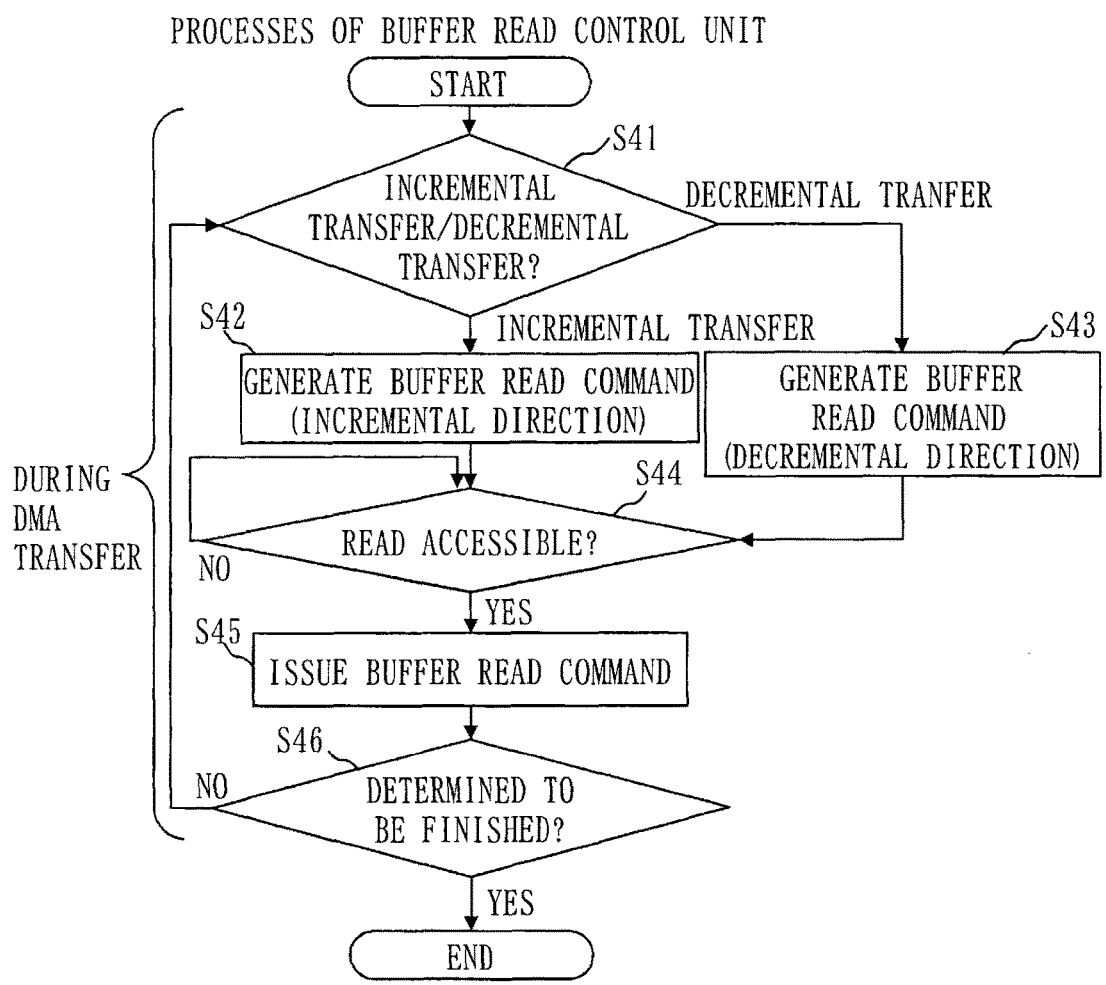
FIG. 12 is a flowchart showing operations of a buffer read control unit 140.

FIG. 12 is a flowchart showing operations of the buffer read control unit 140. FIG. 12 shows the operations of the buffer read control unit 140 in step S13 or S14 in FIG. 9.

In step S41, the buffer read control unit 140 determines whether or not the incremental transfer or the decremental transfer is to be performed, based on the type of transfer transmitted from the data non-destructive control unit 160. When the buffer read control unit 140 determines that the incremental transfer is to be performed, the buffer read control unit 140 causes the procedure to proceed to step S42. When the buffer read control unit 140 determines that the decremental transfer is to be performed, the buffer read control unit 140 causes the procedure to proceed to step S43.

In step S42 or S43, the buffer read control unit 140 generates one burst read command corresponding to one transfer destination write command, as a buffer read command. This buffer read command is a command for sequentially reading the data in the ascending order of the address values starting at a read start address, by using, as the read start address, the address of the internal buffer 130 associated with the write start address of the corresponding transfer destination write command.

In this case, the buffer read control unit 140 obtains from the transfer destination write control unit 150 information such as the write start address and the number of unit amounts of the data to be written by the transfer destination write command to be issued by the transfer write control unit 150, and generates the buffer read command corresponding to the transfer destination write command. Alternatively, the buffer read control unit 140 may determine the write start address and the number of unit amounts of the data to be written by the transfer destination write command to be issued by the transfer write control unit 150, using a logic similar to that of the transfer destination write control unit 150, thereby generating the buffer read command corresponding to the transfer destination write command.

In step S42 or S43, the buffer read control unit 140 sets in the buffer read pointer setting register 163 of the data non-destructive control unit 160 the buffer read pointer indicating the read start address of the buffer read command when generating the buffer read command.

In step S44 subsequent to steps S42 and S43, the buffer read control unit 140 determines whether or not a read access is possible. The buffer read control unit 140 determines that the read access is possible when (1) the data to be written by the transfer destination write command is stored in the internal buffer 130 and (2) a transfer destination writable instruction is received from the data non-destructive control unit 160. When the buffer read control unit 140 determines that the read access is possible (YES in step S44), the buffer read control unit 140 causes the procedure to proceed to step S45. On the other hand, when the buffer read control unit 140 determines that the read access is impossible (NO in step S44), the buffer read control unit 140 returns the procedure to step S44. Then, after a lapse of a predetermined period of time, the buffer read control unit 140 determines again whether or not the read access is possible.

In step S45, the buffer read control unit 140 issues the buffer read command to the internal buffer 130. With this arrangement, the buffer read control unit 140 reads from the internal buffer 130 the data to be written to a transfer destination region by one transfer destination write command and transmits the read data to the memory 300.

Then, in step S46, the buffer read control unit 140 determines whether or not the read access to the internal buffer 130 is to be finished, according to whether or not the buffer read control unit 140 has transmitted to the internal buffer 130 the one or more buffer read commands for writing the data corresponding to the size of the transfer. When the buffer read control unit 140 determines that the read access is to be finished (YES in step S46), the buffer read control unit 140 finishes the procedure. When the buffer read control unit 140 determines that the read access is not to be finished (NO in step S46), the buffer read control unit 140 returns the procedure to step S41.

Figure 13:
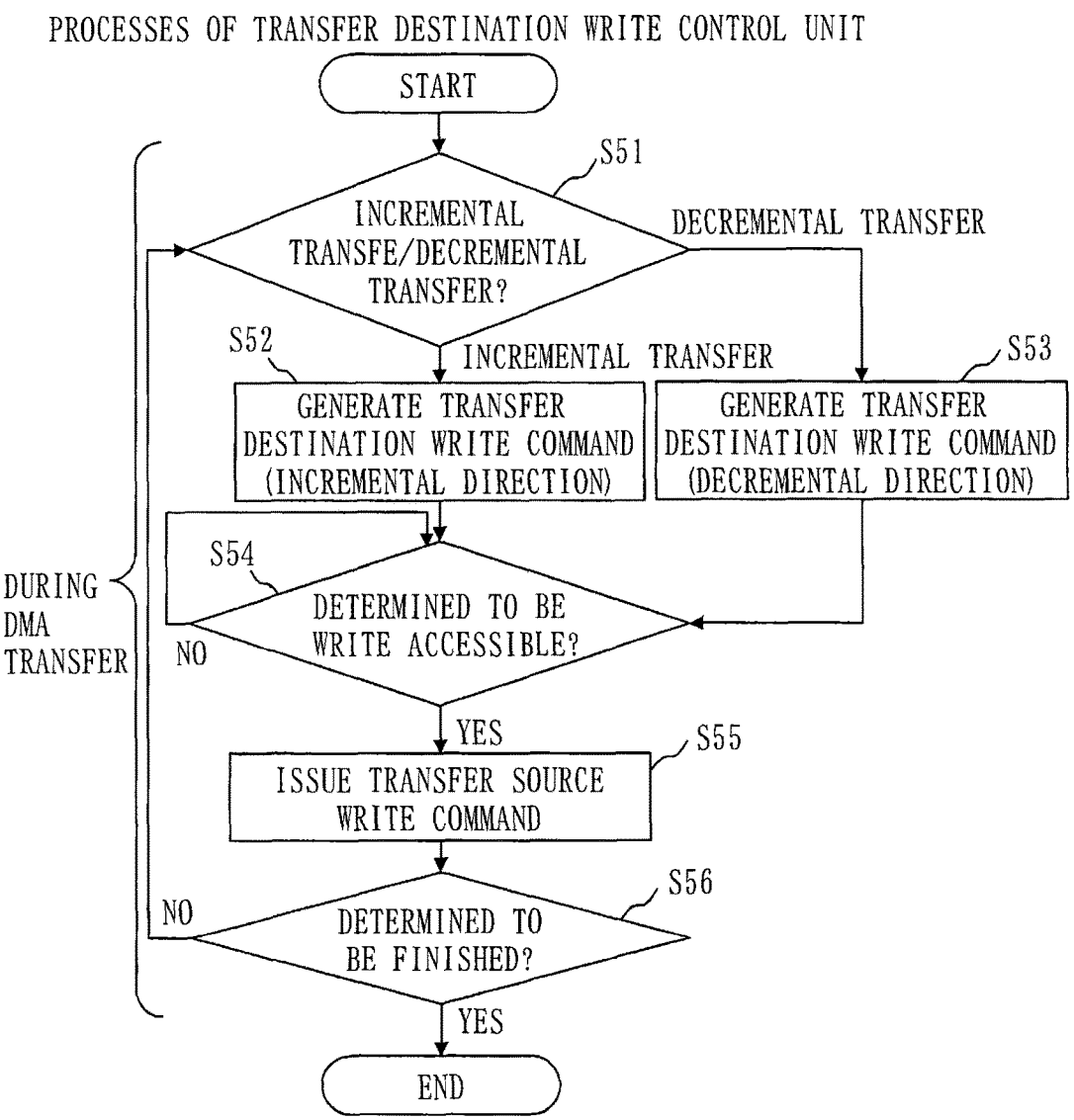
FIG. 13 is a flowchart showing operations of a transfer destination write control unit 150 according to the first embodiment.

FIG. 13 is a flowchart showing operations of the transfer destination write control unit 150 according to the first embodiment. FIG. 13 shows the operations of the transfer destination write control unit 150 in step S13 or S14 in FIG. 9.

In step S51, the transfer destination write control unit 150 determines whether or not the incremental transfer or the decremental transfer is to be performed, based on the type of transfer transmitted from the data non-destructive control unit 160. When the transfer destination write control unit 150 determines that the incremental transfer is to be performed, the transfer destination write control unit 150 causes the procedure to proceed to step S52. When the transfer destination write control unit 150 determines that the decremental transfer is to be performed, the transfer destination write control unit 150 causes the procedure to proceed to step S53.

In steps S52 and S53, the transfer destination write control unit 150 generates one burst write command, as a transfer destination write command. This burst write command is a command for sequentially writing each unit amount of the data in the ascending order of address values starting at the write start address until reaching a predetermined number of unit amounts of the data, as explained based on FIG. 3.

In step S54 subsequent to steps S52 and S53, the transfer destination write control unit 150 determines whether or not a write access is possible, using a condition that is the same as the condition used for determining by the buffer read control unit 140 whether or not the read access is possible. That is, the transfer destination write control unit 150 determines that the write access is possible when (1) the data to be written by the transfer destination write command is stored in the internal buffer 130 and (2) the transfer destination writable instruction is received from the data non-destructive control unit 160. When the transfer destination write control unit 150 determines that the write access is possible (YES in step S54), the transfer destination write control unit 150 causes the procedure to proceed to step S55. On the other hand, when the transfer destination write control unit 150 determines that the write access is impossible (NO in step S54), the transfer destination write control unit 150 returns the procedure to step S54. Then, after a lapse of a predetermined period of time, the transfer destination write control unit 150 determines again whether or not the write access is possible.

In step S55, the transfer destination write control unit 150 issues the generated transfer destination write command to the memory 300 to write the data in the transfer destination region.

Then, in step S56, the transfer destination write control unit 150 determines whether or not to the write access to the memory 300 is to be finished, according to whether or not the transfer destination write control unit 150 has transmitted to the memory 300 the one or more transfer destination write commands for writing the data corresponding to the size of transfer. When the transfer destination write control unit 150 determines that the write access is to be finished (YES in step S56), the transfer destination write control unit 150 finishes the procedure. On the other hand, when the transfer destination write control unit 150 determines that the write access is not to be finished (NO in step S56), the transfer destination write control unit 150 returns the procedure to step S51, generates a subsequent transfer destination write command, and transmits to the memory 300 the generated subsequent transfer destination write command to write the data.

In step S52, the transfer destination write control unit 150 generates the burst write commands in the incremental direction. That is, the transfer destination write control unit 150 generates the burst write commands such that address values of write start addresses of the burst write commands are arranged in the ascending order.

On the other hand, in step S53, the transfer destination write control unit 150 generates the burst write commands in the decremental direction. That is, the transfer destination write control unit 150 generates the burst write commands such that the address values of the write start addresses of the burst write commands are arranged in the descending order.

Figure 14:
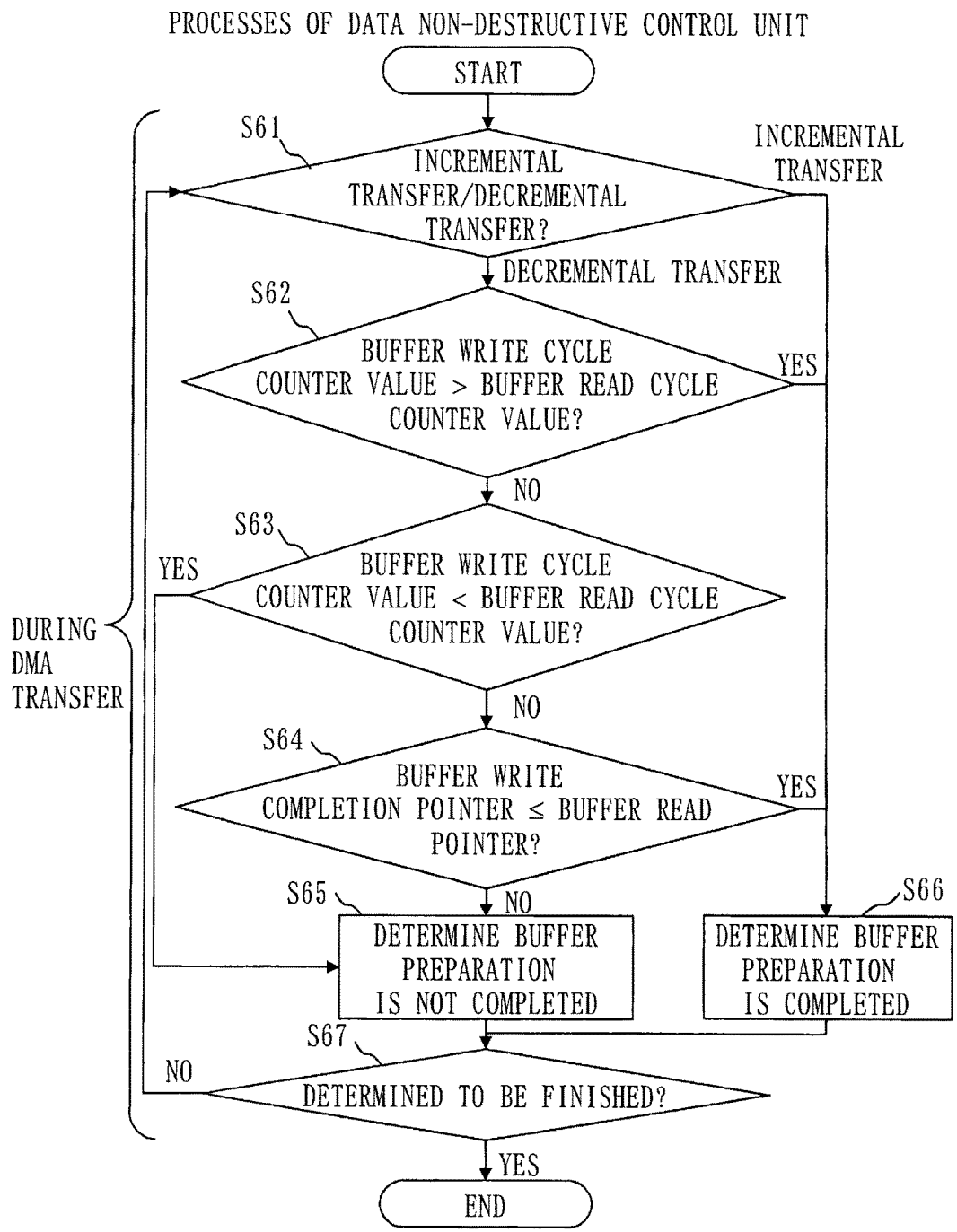
FIG. 14 is a flowchart showing operations of the data non-destructive control unit 160 according to the first embodiment.

FIG. 14 is a flowchart showing operations of the data non-destructive control unit 160 according to the first embodiment. FIG. 14 shows the operations of the data non-destructive control 160 in step S13 or S14 in FIG. 9.

In step S61, the data non-destructive control unit 160 determines whether or not the incremental transfer or the decremental transfer is to be performed, based on the type of transfer set in the transfer type setting register 161. When the data non-destructive control unit 160 determines that the decremental transfer is to be performed, the data non-destructive control unit 160 causes the procedure to proceed to step S62. When the data non-destructive control unit 160 determines that the incremental transfer is to be performed, the data non-destructive control unit 160 causes the procedure to proceed to step S66.

In step S62, the data non-destructive control unit 160 determines whether or not a buffer write cycle counter value counted by the buffer write cycle counting unit 170 is larger than a buffer read cycle counter value counted by the buffer read cycle counting unit 180. When it is determined that the buffer write cycle counter value is not larger than the buffer read cycle counter value (NO in step S62), the data non-destructive control unit 160 causes the procedure to proceed to step S63. When it is determined that the buffer write cycle counter value is larger than the buffer read cycle counter value (YES in step S62), the data non-destructive control unit 160 causes the procedure to proceed to step S66.

In step S63, the data non-destructive control unit 160 determines whether or not the buffer write cycle counter value counted by the buffer write cycle counting unit 170 is smaller than the buffer read cycle counter value counted by the buffer read cycle counting unit 180. When it is determined that the buffer write cycle counter value is not smaller than the buffer read cycle counter value (NO in step S63), the data non-destructive control unit 160 causes the procedure to proceed to step S64. When it is determined that the buffer write cycle counter value is smaller than the buffer read cycle counter value (YES in step S63), the data non-destructive control unit 160 causes the procedure to proceed to step S65.

In step S64, the data non-destructive control unit 160 determines whether or not the address value indicated by the buffer write completion pointer set in the buffer write completion pointer setting register 162 is equal or less than the address value indicated by the buffer read pointer set in the buffer read pointer setting register 163. When it is determined that the address value indicated by the buffer write completion pointer is not equal to or less than the address value indicated by the buffer read pointer (NO in step S64), the data non-destructive control unit 160 causes the procedure to proceed to step S65. On the other hand, when it is determined that the address value indicated by the buffer write completion pointer is equal to or less than the address value indicated by the buffer read pointer (YES in step S64), the data non-destructive control unit 160 causes the procedure to proceed to step S66.

In step S65, the data non-destructive control unit 160 determines that preparation for reading from the buffer has not been completed, and the data non-destructive control unit 160 does not therefore transmit the transfer destination writable instruction. On the other hand, in step S66, the data non-destructive control unit 160 determines that the preparation for reading from the buffer has been completed, and the data non-destructive control unit 160 therefore transmits the transfer destination writable instruction to the buffer read control unit 140 and the transfer destination write control unit 150.

In step S67, the data non-destructive control unit 160 determines whether or not to finish the procedure, according to whether or not transfer of the data corresponding to the size of the transfer has been completed. When the data non-destructive control unit 160 determines to finish the procedure (YES in step S67), the data non-destructive control unit 160 finishes the procedure. On the other hand, when the data non-destructive control unit 160 determines not to finish the procedure (NO in step S67), the data non-destructive control unit 160 returns the procedure to step S61, and then determines again whether or not the preparation for reading from the buffer has been completed.

That is, in the case of the incremental transfer, it is constantly determined that the preparation for reading from the buffer has been completed.

On the other hand, in the case of the decremental transfer, (1) when it holds that "the buffer write cycle counter value>the buffer read cycle counter value", and
(2) when it holds that "the buffer write cycle counter value=the buffer read cycle counter value" and that "the address value indicated by the buffer write completion pointer≤the address value indicated by the buffer read pointer", it is determined that the preparation for reading from the buffer has been completed.

Figure 15:
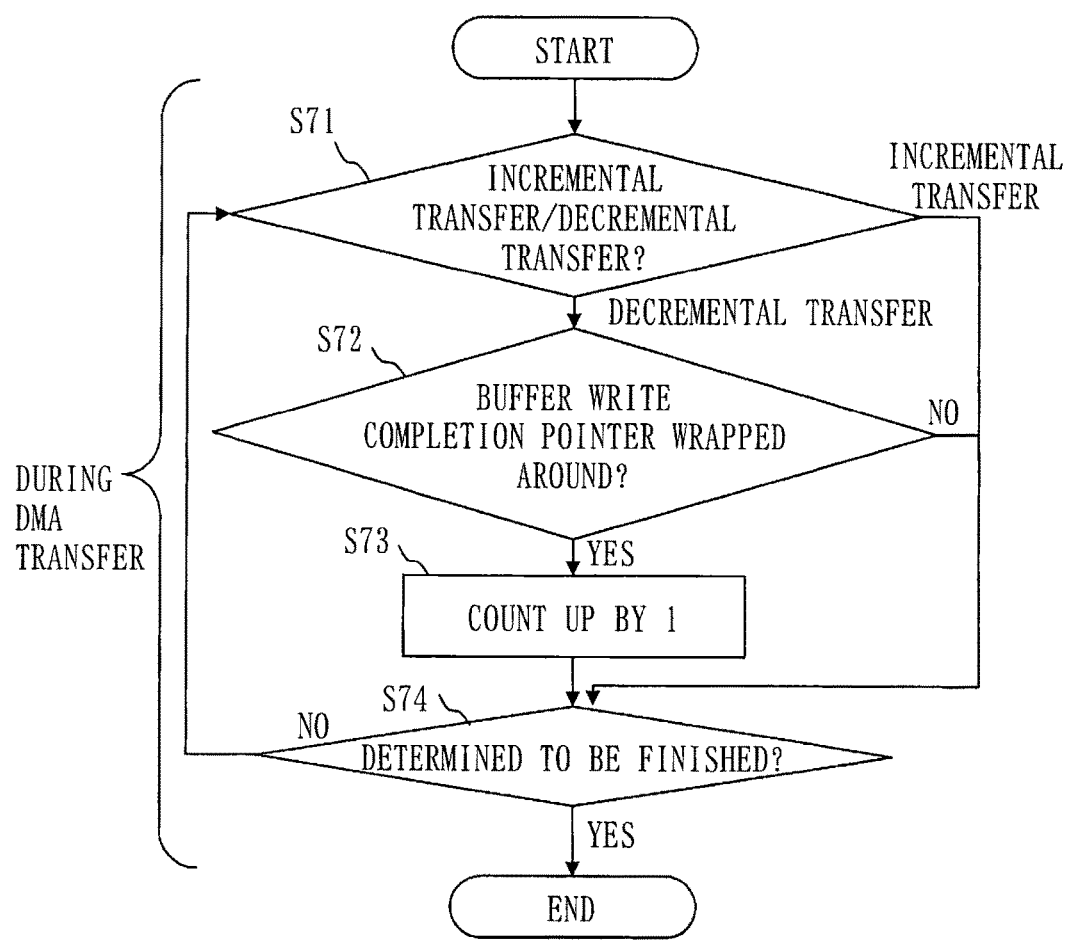
FIG. 15 is a flowchart showing operations of the buffer write cycle counting unit 170 according to the first embodiment.

FIG. 15 is a flowchart showing operations of the buffer write cycle counting unit 170 according to the first embodiment. FIG. 15 shows the operations of the buffer write cycle counting unit 170 in step S13 or S14 in FIG. 9.

In step S71, the buffer write cycle counting unit 170 determines whether or not the incremental transfer or the decremental transfer is to be performed, based on the type of transfer transmitted from the data non-destructive control unit 160. When the buffer write cycle counting unit 170 determines that the decremental transfer is to be performed, the buffer write cycle counting unit 170 causes the procedure to proceed to step S72. When the buffer write cycle counting unit 170 determines that the incremental transfer is to be performed, the buffer write cycle counting unit 170 causes the procedure to proceed to step S74.

In step S72, the buffer write cycle counting unit 170 determines whether or not the buffer write completion pointer generated by the buffer write control unit 120 has wrapped around. When the buffer write cycle counting unit 170 determines that the buffer write completion pointer has wrapped around (YES in step S72), the buffer write cycle counting unit 170 causes the procedure to proceed to step S73. When the buffer write cycle counting unit 170 determines that the buffer write completion pointer has not wrapped around (NO in step S72), the buffer write cycle counting unit 170 causes the procedure to proceed to step S74.

In step S73, the buffer write cycle counting unit 170 counts up the counter by +1.

In step S74, the buffer write cycle counting unit 170 determines whether or not to finish the procedure, according to whether or not transfer of the data corresponding to the size of the transfer has been completed. When the buffer write cycle counting unit 170 determines to finish the procedure (YES in step S74), the buffer write cycle counting unit 170 finishes the procedure. On the other hand, when the buffer write cycle counting unit 170 determines not to finish the procedure (NO in step S74), the buffer write cycle counting unit 170 returns the procedure to step S71, and determines again whether or not the counter is to be counted up.

Figure 16:
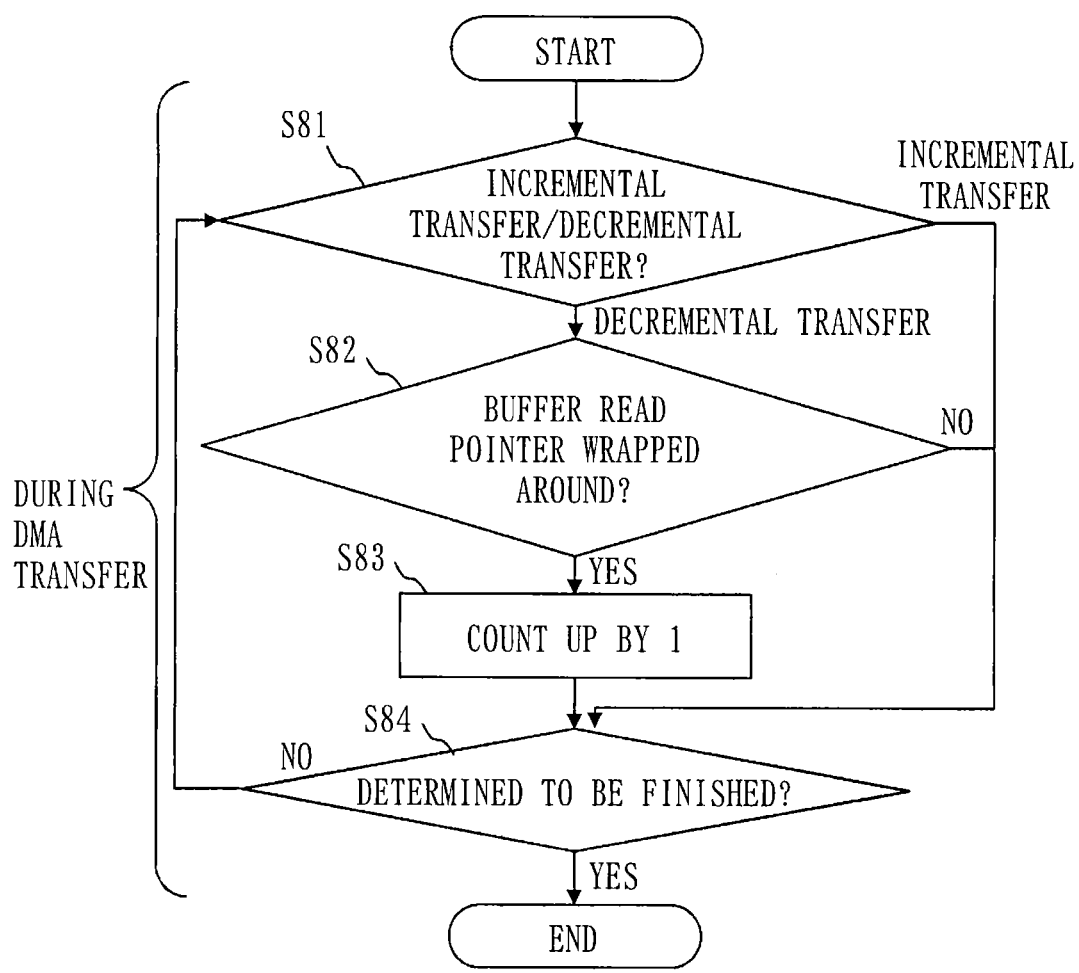
FIG. 16 is a flowchart showing operations of the buffer read cycle counting unit 180 according to the first embodiment.

FIG. 16 is a flowchart showing operations of the buffer read cycle counting unit 180 according to the first embodiment. FIG. 16 shows the operations of the buffer read cycle counting unit 180 in step S13 or S14 in FIG. 9.

In step S81, the buffer read cycle counting unit 180 determines whether or not the incremental transfer or the decremental transfer is to be performed, based on the type of transfer transmitted from the data non-destructive control unit 160. When the buffer read cycle counting unit 180 determines that the decremental transfer is to be performed, the buffer read cycle counting unit 180 causes the procedure to proceed to step S82. When the buffer read cycle counting unit 180 determines that the incremental transfer is to be performed, the buffer read cycle counting unit 180 causes the procedure to proceed to step S84.

In step S82, the buffer read cycle counting unit 180 determines whether or not the buffer read pointer generated by the buffer read control unit 140 has wrapped around. When the buffer read cycle counting unit 180 determines that the buffer read pointer has wrapped around (YES in step S82), the buffer read cycle counting unit 180 causes the procedure to proceed to step S83. When the buffer read cycle counting unit 180 determines that the buffer read pointer has not wrapped around (NO in step S82), the buffer read cycle counting unit 180 causes the procedure to proceed to step S84.

In step S83, the buffer read cycle counting unit 180 counts up the counter by +1.

In step S84, the buffer read cycle counting unit 180 determines whether or not to finish the procedure, according to whether or not transfer of the data corresponding to the size of the transfer has been completed. When the buffer read cycle counting unit 180 determines to finish the procedure (YES in step S84), the buffer read cycle counting unit 180 finishes the procedure. On the other hand, when the buffer read cycle counting unit 180 determines not to finish the procedure (NO in step S84), the buffer read cycle counting unit 180 returns the procedure to step S81, and determines again whether or not the counter is to be counted up.

Next, specific operation examples of the DMA transfer control apparatus 100 will be described.

FIGS. 17 to 21 are each a diagram showing a change in data during a DMA transfer when the data of a size larger than the size of the internal buffer 130 have been DMA-transferred, and the buffer write completion pointer has wrapped around earlier. That is, FIGS. 17 to 21 are each the diagram showing the change in the data when "the buffer write cycle counter value>the buffer read cycle counter value".

It is assumed in the example in each of FIGS. 17 to 21 that the size of the internal buffer 130 is 64 bytes of which two bytes are indicated by each cell. It is also assumed that a transfer source and a transfer destination in each of FIGS. 17 to 21 are a same device, and each cell of the transfer source and the transfer destination indicates two bytes.

In the example in each of FIGS. 17 to 21, the data in a region of the transfer source specified by addresses 00h to 58h are transferred to a region of the transfer destination specified by addresses 20h to 78h, by the decremental transfer. The DMA transfer control apparatus 100 issues to the transfer source a read 1 (four-burst read) command, a read 2 (four-burst read) command, and a read 3 (four-burst read) command in this stated order. The DMA transfer control apparatus 100 issues to the transfer destination a write 1 (four-burst write) command, a write 2 (four-burst write) command, and a write 3 (four-burst write) command in this stated order.

Read orders shown on the right side of the transfer source in each of FIGS. 17 to 21 indicate orders in which the DMA transfer control apparatus 100 obtains the read data. The DMA transfer control apparatus 100 receives the read data in the order of R1 to R12, and writes the read data into the internal buffer 130 in the same order. Write orders shown on the right side of the transfer destination in each of FIGS. 17 to 21 indicate orders in which the DMA transfer control apparatus 100 outputs the data to the transfer destination. The DMA transfer control apparatus 100 receives the write data from the internal buffer 130 in the order of W1 to W12, and writes the write data into the transfer destination in the same order.

The buffer write completion pointer in each of FIGS. 17 to 21 indicates a region of the internal buffer 130 where the data could be prepared, and the buffer read pointer indicates a region of the internal buffer 130 to be read. The buffer write cycle counter indicates the number of times of wrap-arounds of the buffer write completion pointer, and the buffer read cycle counter indicates the number of times of wrap-arounds of the buffer read pointer. Each of the pointers counts up by +1 for each wrap-around.

First, in step S11, the following setting information is set in the DMA
transfer control apparatus 100:
transfer source address: 00h
transfer destination address: 20h
transfer size: 96 bytes
type of transfer: decremental transfer Next, in step S12, the decremental transfer is notified to each control unit and each counting unit by the data non-destructive control unit 160. Then, the procedure proceeds to step S14, where the DMA transfer using the decremental transfer is executed.

Figure 17:
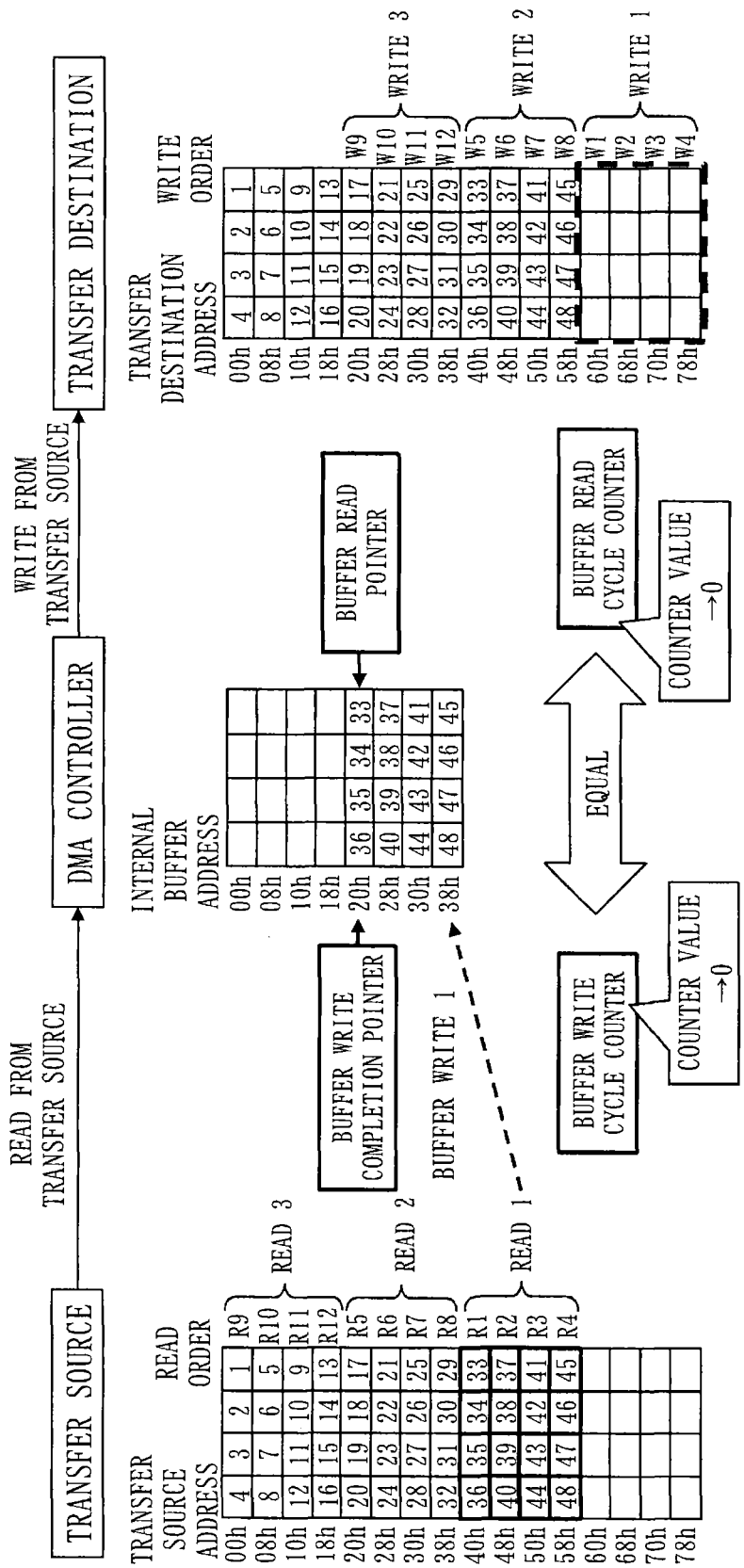
FIG. 17 is a diagram (1-1) showing a change in data during a DMA transfer.

In a procedure 1 shown in FIG. 17, the transfer source read control unit 110 issues the read 1 (four-burst read) command to the region of the transfer source at the addresses 40h to 58h. Upon receipt of the read data from the transfer source, the buffer write control unit 120 issues to the internal buffer 130 a buffer write 1 command corresponding to the read 1 command to write the read data into a region of the internal buffer 130 at addresses 20h to 38h. When the operation specified by the buffer write 1 command is completed, the buffer write control unit 120 updates the buffer write completion pointer to the address 20h.

The buffer read control unit 140 sets the buffer read pointer to the address 20h (read region of the data to be output according to the write 1 (four-burst write) command that will be issued to the transfer destination).

Figure 18:
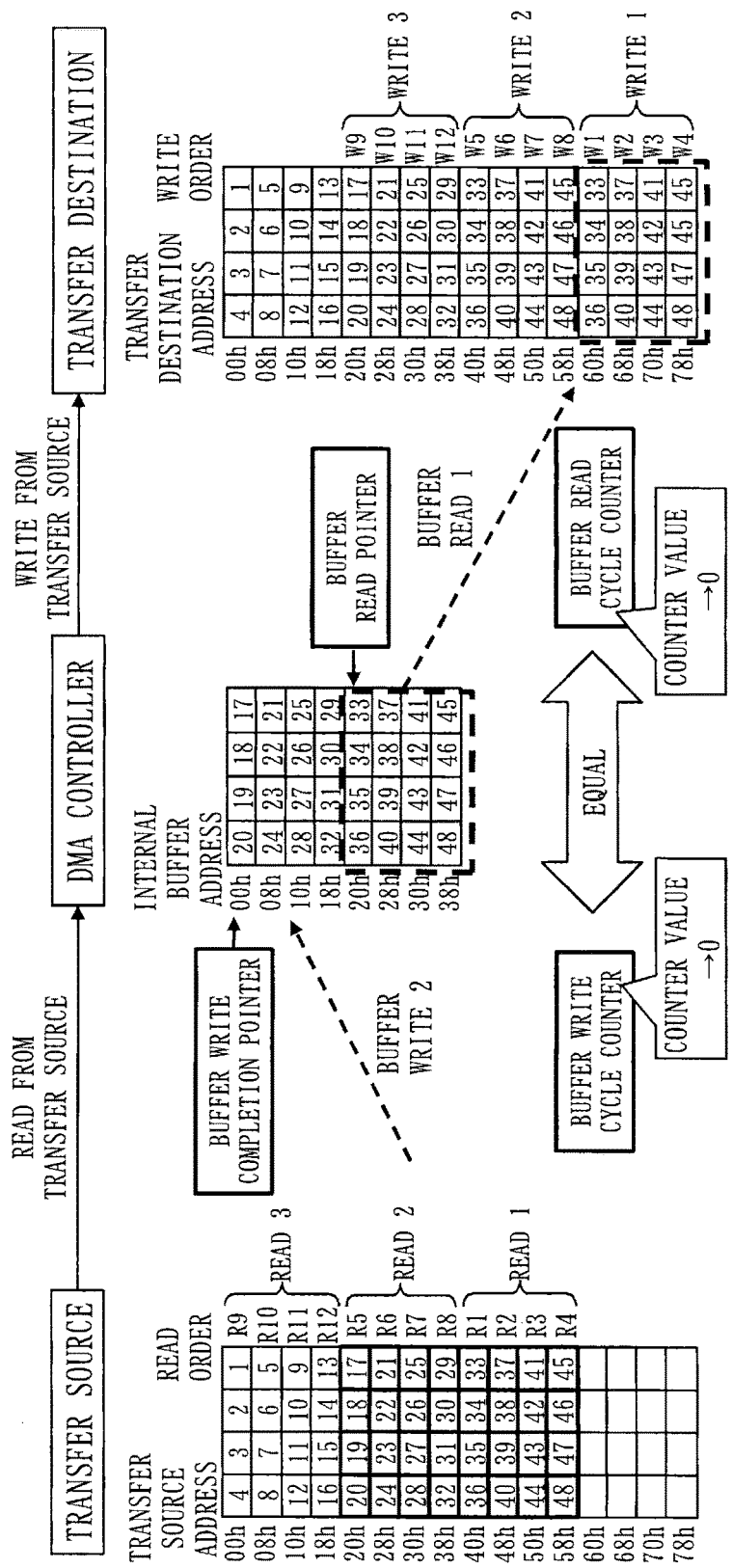
FIG. 18 is a diagram (1-2) showing a change in the data during the DMA transfer.

In a procedure 2 shown in FIG. 18, the transfer source read control unit 110 issues the read 2 (four-burst read) command to the region of the transfer source at the addresses 20h to 38h. Upon receipt of the read data from the transfer source, the buffer write control unit 120 issues to the internal buffer 130 a buffer write 2 command corresponding to the read 2 command to write the read data into a region of the internal buffer 130 at addresses 00h to 18h. When the operation specified by the buffer write 2 command is completed, the buffer write control unit 120 updates the buffer write completion pointer to the address 00h.

In parallel with the read from the transfer source, the data non-destructive control unit 160 detects that "the buffer write cycle counter value=the buffer read cycle counter value" and "the buffer write completion pointer value≤the buffer read pointer value", thereby outputting a transfer destination writable instruction. Upon detection of the transfer source writable instruction, the buffer read control unit 140 issues a buffer read 1 command to the region of the internal buffer 130 at the addresses 20h to 38h to read the data to be written to the transfer destination. The transfer destination write control unit 150 issues the write 1 (four-burst write) command to the region of the transfer destination at the addresses 60h to 78h.

Figure 19:
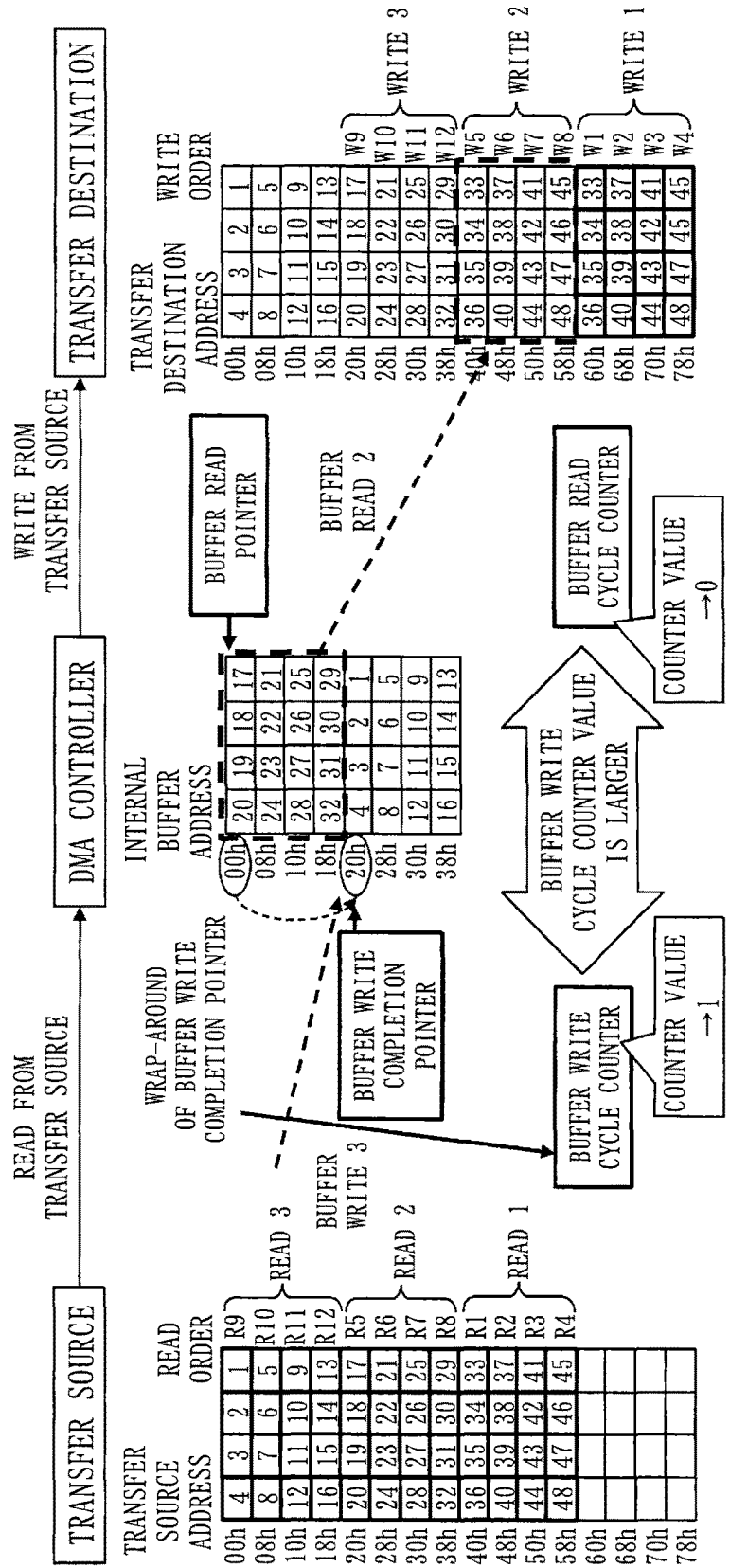
FIG. 19 is a diagram (1-3) showing a change in the data during the DMA transfer.

In a procedure 3 shown in FIG. 19, the transfer source read control unit 110 issues the read 3 (four-burst read) command to the region of the transfer source at the addresses 00h to 18h. Upon receipt of the read data from the transfer source, the buffer write control unit 120 issues a buffer write 3 command corresponding to the read 3 command to the internal buffer 130 to write the read data into the region of the internal buffer 130 at the addresses 20h to 38h. When the operation specified by the buffer write 3 command is completed, the buffer write completion pointer is updated to the address 20h. A wrap-around thereby occurs. The buffer write cycle counting unit 170 detects the wrap-around of the buffer write completion pointer and then counts up the buffer write cycle counter value by +1.

The buffer read control unit 140 updates the buffer read pointer to the address 00h when the operation specified by the buffer read 1 command is completed. The data non-destructive control unit 160 detects that "the buffer write cycle counter value>the buffer read cycle counter value", determines that data preparation is completed, and then outputs a transfer destination writable instruction. The buffer read control unit 140 issues a buffer read 2 command to the region of the internal buffer 130 at the addresses 00h to 18h, upon detection of the transfer destination writable instruction. The transfer destination write control unit 150 issues the write 2 (four-burst write) command to the region of the transfer destination at the addresses 40h to 58h.

Figure 20:
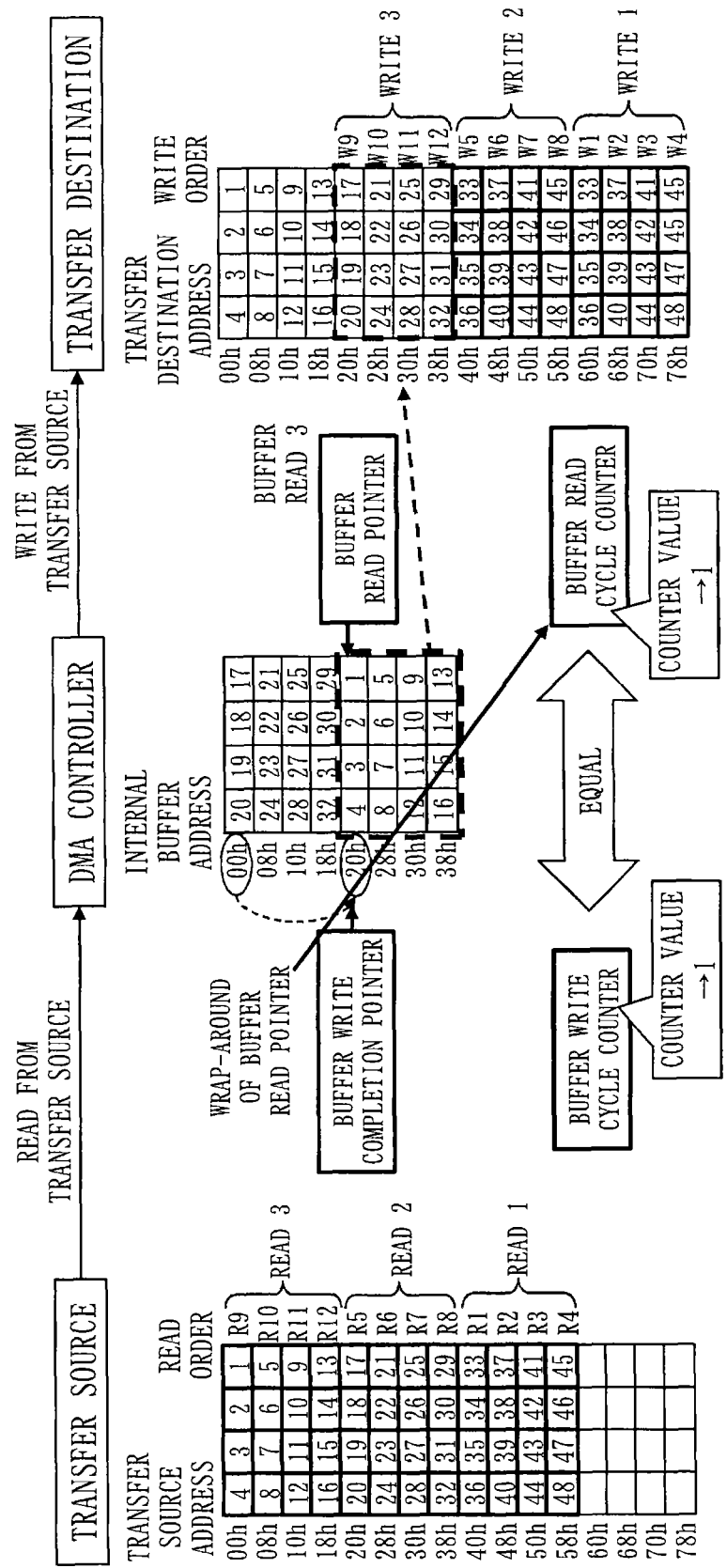
FIG. 20 is a diagram (1-4) showing a change in the data during the DMA transfer.

In a procedure 4 shown in FIG. 20, when the operation specified by the buffer read 2 command is completed, the buffer read control unit 140 updates the buffer read pointer to the address 20h. A wrap-around thereby occurs. The buffer read cycle counting unit 180 detects the wrap-around and then counts up the buffer read cycle counter value by +1. The data non-destructive control unit 160 detects that "the buffer write cycle counter value=the buffer read cycle counter value", and "the buffer write completion pointer value≤the buffer read pointer value", determines that data preparation is completed, and then outputs a transfer destination writable instruction. The buffer read control unit 140 issues a buffer read 3 command to the region of the internal buffer 130 at the addresses 20h to 38h, upon detection of the transfer destination writable instruction. The transfer destination write control unit 150 issues the write 3 (four-burst write) command to the region of the transfer destination at the addresses 20h to 38h.

Figure 21:
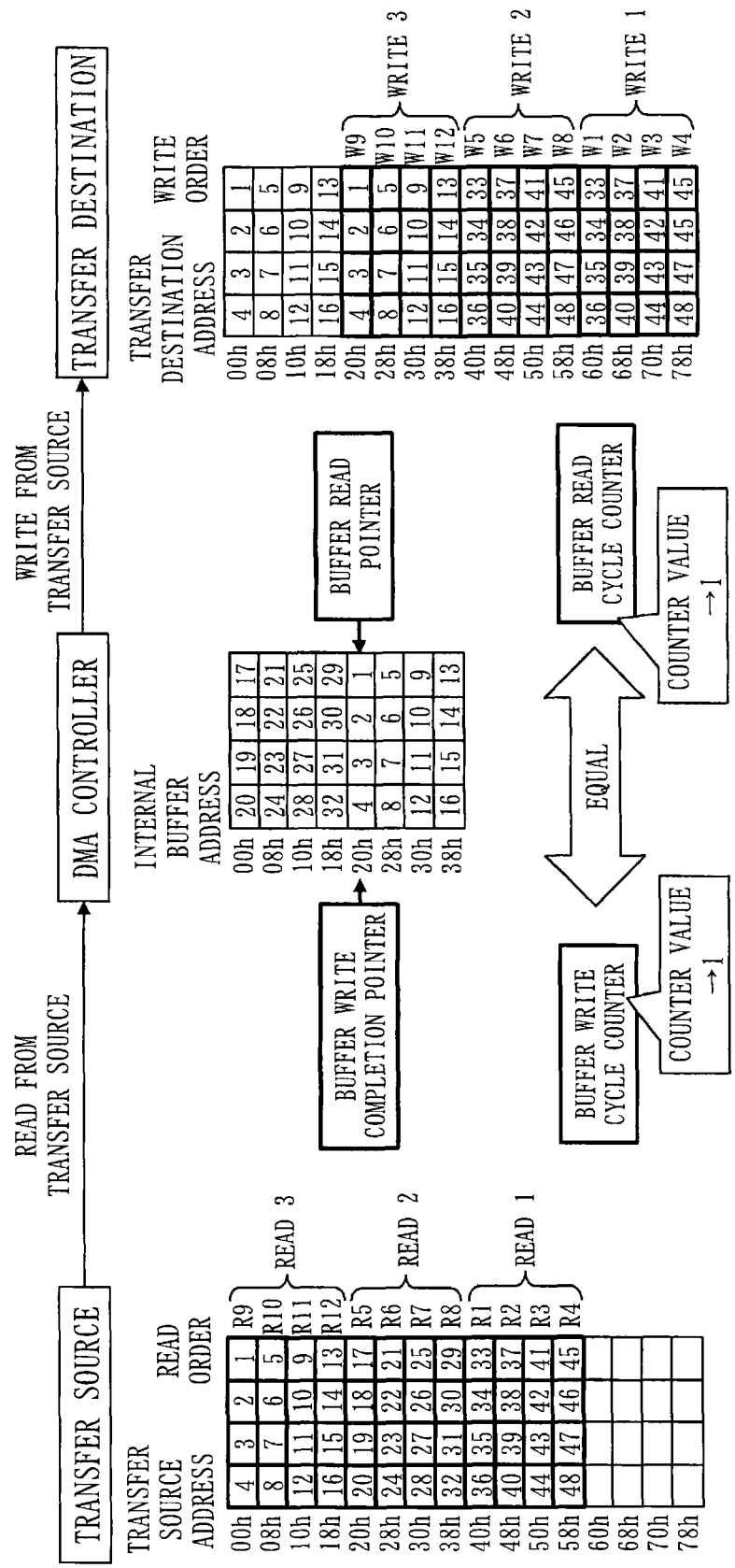
FIG. 21 is a diagram (1-5) showing a change in the data during the DMA transfer.

In a procedure 5 shown in FIG. 21, the DMA transfer result is shown. As shown in the transfer destination, the transfer of the data is completed, without occurrence of destruction of the data.

FIGS. 22 to 26 each shows a diagram showing a change in data during a DMA transfer when the data of a size larger than the size of the internal buffer 130 have been DMA-transferred, and the buffer read pointer has wrapped around earlier. That is, FIGS. 22 to 26 are each the diagram showing the change in the data when "the buffer write cycle counter value<the buffer read cycle counter value".

It is assumed in the example in each of FIGS. 22 to 26 that the size of the internal buffer 130 is 64 bytes of which two bytes are indicated by each cell. It is also assumed that a transfer source and a transfer destination in each of FIGS. 22 to 26 are a same device, and each cell of the transfer source and the transfer destination indicates two bytes.

In the example in each of FIGS. 22 to 26, the data in a region of the transfer source specified by addresses 08h to 58h are transferred to a region of the transfer destination specified by addresses 20h to 70h by the decremental transfer. The DMA transfer control apparatus 100 issues to the transfer source a read 1 (four-burst read) command, a read 2 (four-burst read) command, and a read 3 (three-burst read) command in this stated order. The DMA transfer control apparatus 100 issues to the transfer destination a write 1 (three-burst write) command, a write 2 (four-burst write) command, and a write 3 (four-burst read) command in this stated order. When the address of a read destination and the address of a write destination each extend across a 32-byte boundary, a command for burst transfer of three bursts or less is issued for rounding.

Read orders shown on the right side of the transfer source in each of FIGS. 22 to 26 indicate orders in which the DMA transfer control apparatus 100 obtains the read data. The DMA transfer control apparatus 100 receives the read data in the order of R1 to R11, and writes the read data into the internal buffer 130 in the same order. Write orders shown on the right side of the transfer destination in each of FIGS. 22 to 26 indicate orders in which the DMA transfer control apparatus 100 outputs the data to the transfer destination. The DMA transfer control apparatus 100 receives the write data from the internal buffer 130 in the order of W1 to W11, and writes the received write data into the transfer destination in the same order.

The buffer write completion pointer in each of FIGS. 22 to 26 indicates a region of the internal buffer 130 where the data could be prepared, and the buffer read pointer indicates a region of the internal buffer 130 to be read. The buffer write cycle counter indicates the number of times of wrap-arounds of the buffer write completion pointer, and the buffer read cycle counter indicates the number of times of wrap-arounds of the buffer read pointer. Each of the pointers counts up by +1 for each wrap-around.

First, in step S11, the following setting information is set in the DMA
transfer control apparatus 100:
transfer source address: 08h
transfer destination address: 20h
transfer size: 88 bytes
type of transfer: decremental transfer Next, in step S12, the decremental transfer is notified to each control unit and each counting unit by the data non-destructive control unit 160. Then, the procedure proceeds to step S14, where the DMA transfer is executed by the decremental transfer.

Figure 22:
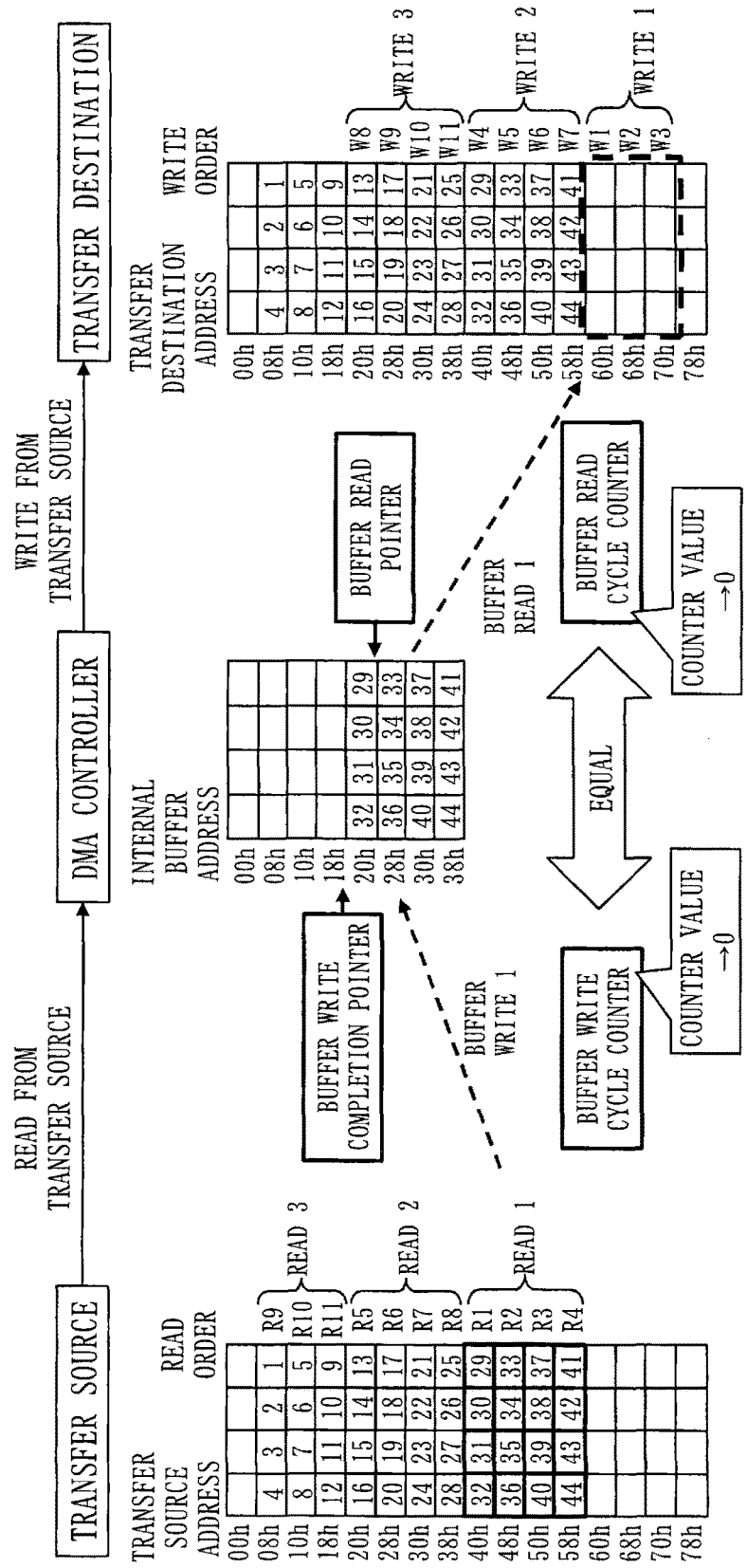
FIG. 22 is a diagram (2-1) showing a change in data during a DMA transfer.

In a procedure 1 shown in FIG. 22, the transfer source read control unit 110 issues the read 1 (four-burst read) command to the region of the transfer source at the addresses 40h to 58h. Upon receipt of the read data from the transfer source, the buffer write control unit 120 issues to the internal buffer 130 a buffer write 1 command corresponding to the read 1 command to write the read data into the region of the internal buffer 130 at the addresses 20h to 38h. When the operation specified by the buffer write 1 command is completed, the buffer write control unit 120 updates the buffer write completion pointer to the address 20h.

The buffer read control unit 140 sets the buffer read pointer to the read region (at the address 28h) of the data is to be output according to the write 1 (three-burst write) command that will be issued to the transfer destination. The data non-destructive control unit 160 detects that "the buffer write cycle counter value=the buffer read cycle counter value" and "the buffer write completion pointer value≤the buffer read pointer value", thereby outputting a transfer destination writable instruction. Upon detection of the transfer destination writable instruction, the buffer read control unit 140 issues a buffer read 1 command to a region of the internal buffer 130 at the addresses 28h to 38h to read the data to be written to the transfer destination. The transfer destination write control unit 150 issues the write 1 (three-burst write) command to the region of the transfer destination at the addresses 60h to 70h.

Figure 23:
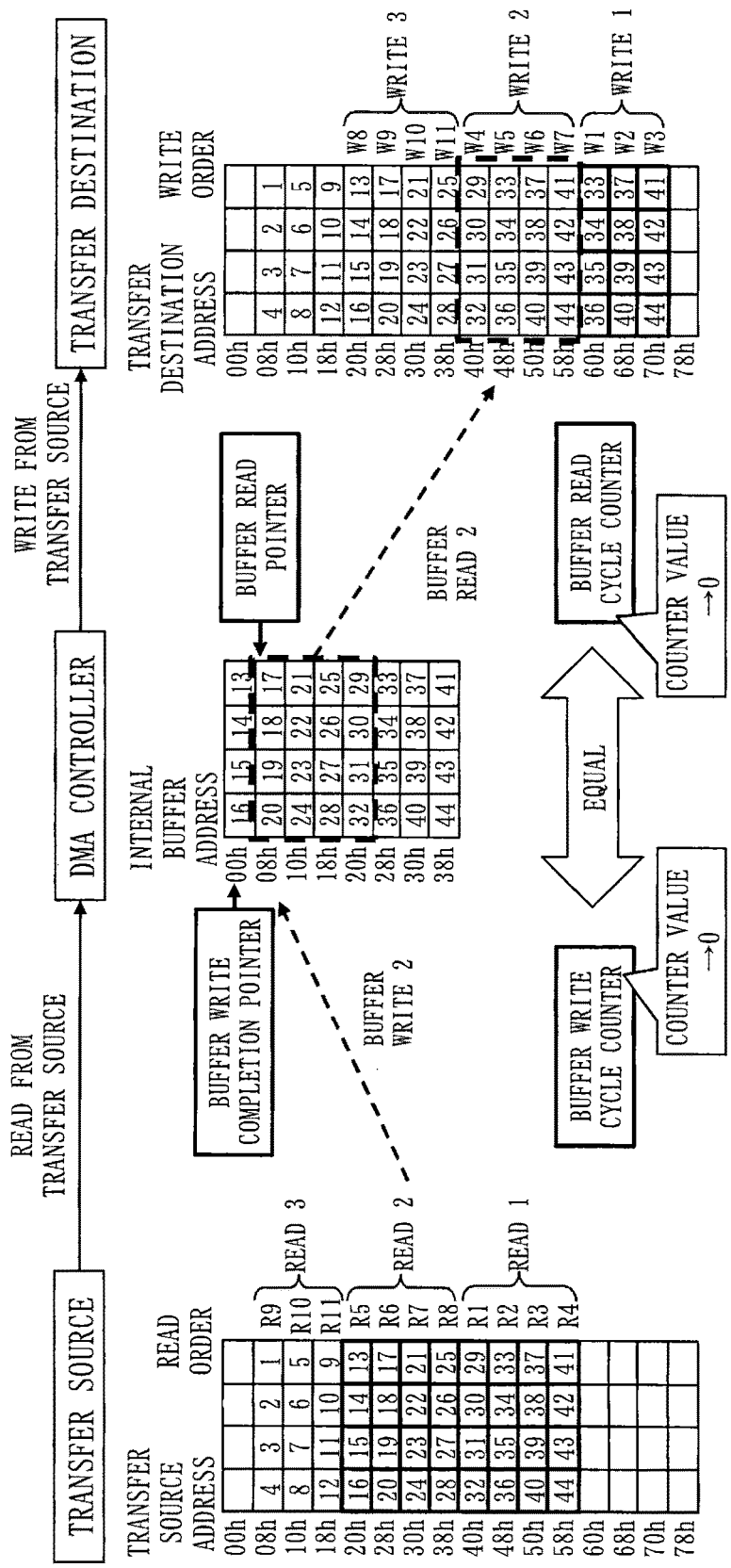
FIG. 23 is a diagram (2-2) showing a change in the data during the DMA transfer.

In a procedure 2 shown in FIG. 23, the transfer source read control unit 110 issues the read 2 (four-burst read) command to the region of the transfer source at the addresses 20h to 38h. Upon receipt of the read data from the transfer source, the buffer write control unit 120 issues to the internal buffer 130 a buffer write 2 command corresponding to the read 2 command to write the read data into the region of the internal buffer 130 at the addresses 00h to 18h. When the operation specified by the buffer write 2 command is completed, the buffer write control unit 120 updates the buffer write completion pointer to the address 00h.

When the operation specified by the buffer read 1 command is completed, the buffer read control unit 140 updates the buffer read pointer to the address 08h. The data non-destructive control unit 160 detects that "the buffer write cycle counter value=the buffer read cycle counter value" and "the buffer write completion pointer value≤the buffer read pointer value", thereby outputting a transfer source writable instruction. Upon detection of the transfer source writable instruction, the buffer read control unit 140 issues a buffer read 2 command to a region of the internal buffer 130 at the addresses 08h to 20h to read the data to be written to the transfer destination. The transfer destination write control unit 150 issues the write 2 (four-burst write) command to the region of the transfer destination at the addresses 40h to 58h.

Figure 24:
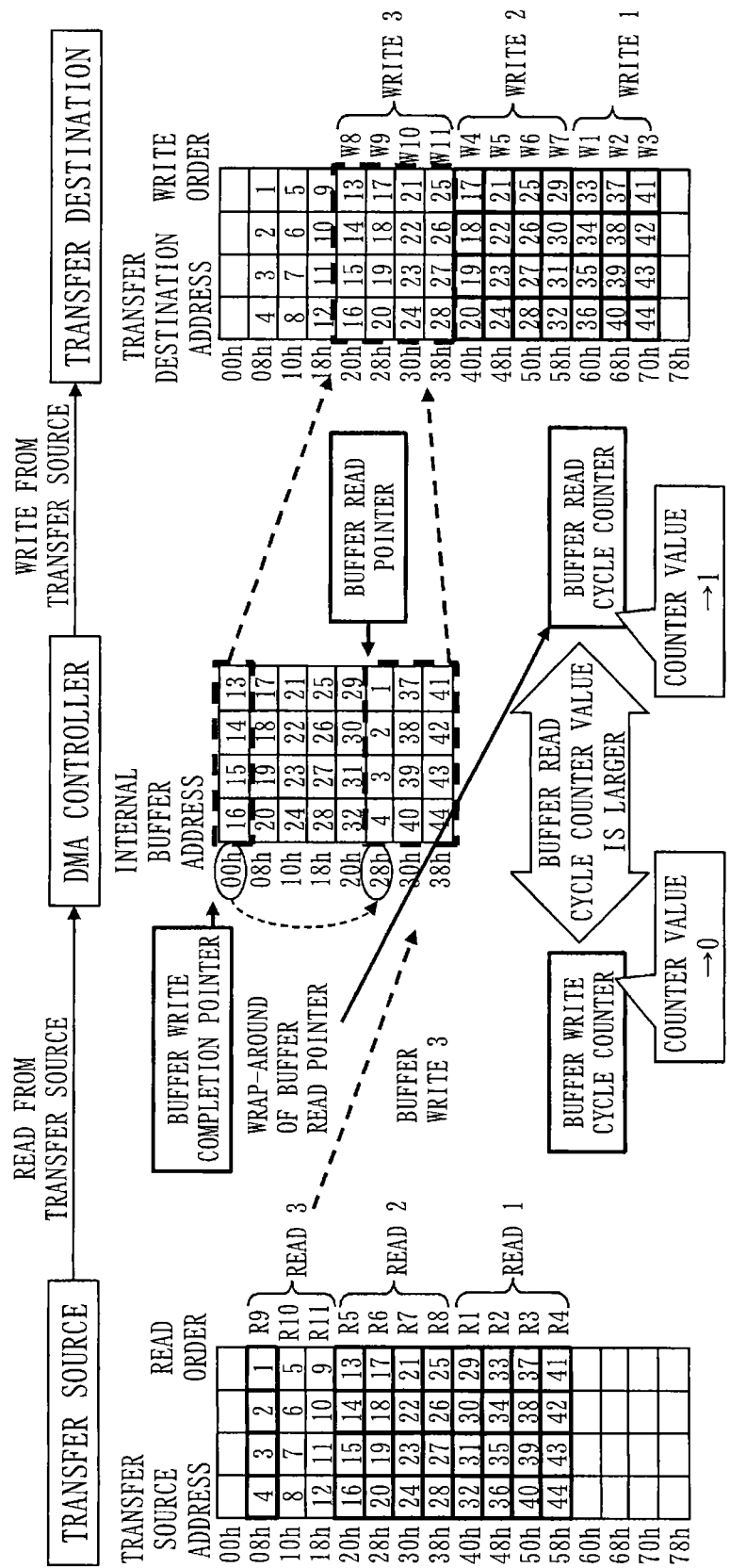
FIG. 24 is a diagram (2-3) showing a change in the data during the DMA transfer.

In a procedure 3 shown in FIG. 24, the transfer source read control unit 110 issues the read 3 (three-burst read) command to the region of the transfer source at the addresses 08h to 18h. Upon receipt of the read data from the transfer source, the buffer write control unit 120 issues a buffer write 3 command corresponding to the read 3 command to the internal buffer 130 to write the read data into the region of the internal buffer 130 at the addresses 28h to 38h. It is assumed herein that the operation specified by the buffer write 3 command is not completed. Thus, the buffer write completion pointer is not updated.

Since the operation specified by the buffer read 2 command has been completed, the buffer read control unit 140 updates the buffer read pointer to the address 28h. A wrap-around thereby occurs. The buffer read cycle counting unit 180 detects the wrap-around and then counts up the buffer read cycle counter value by +1. The data non-destructive control unit 160 detects that "the buffer write cycle counter value<the buffer read cycle counter value", determines that data preparation is not completed, and does not therefore output a transfer destination writable instruction (does not permit a write to the transfer destination). The buffer read control unit 140 does not detect the transfer destination writable instruction. Thus, the buffer read control unit 140 does not issue a subsequent buffer read command to the internal buffer 130. Similarly, the transfer destination write control unit 150 also does not issue the subsequent write 3 (four-burst write) command to the transfer destination.

Figure 25:
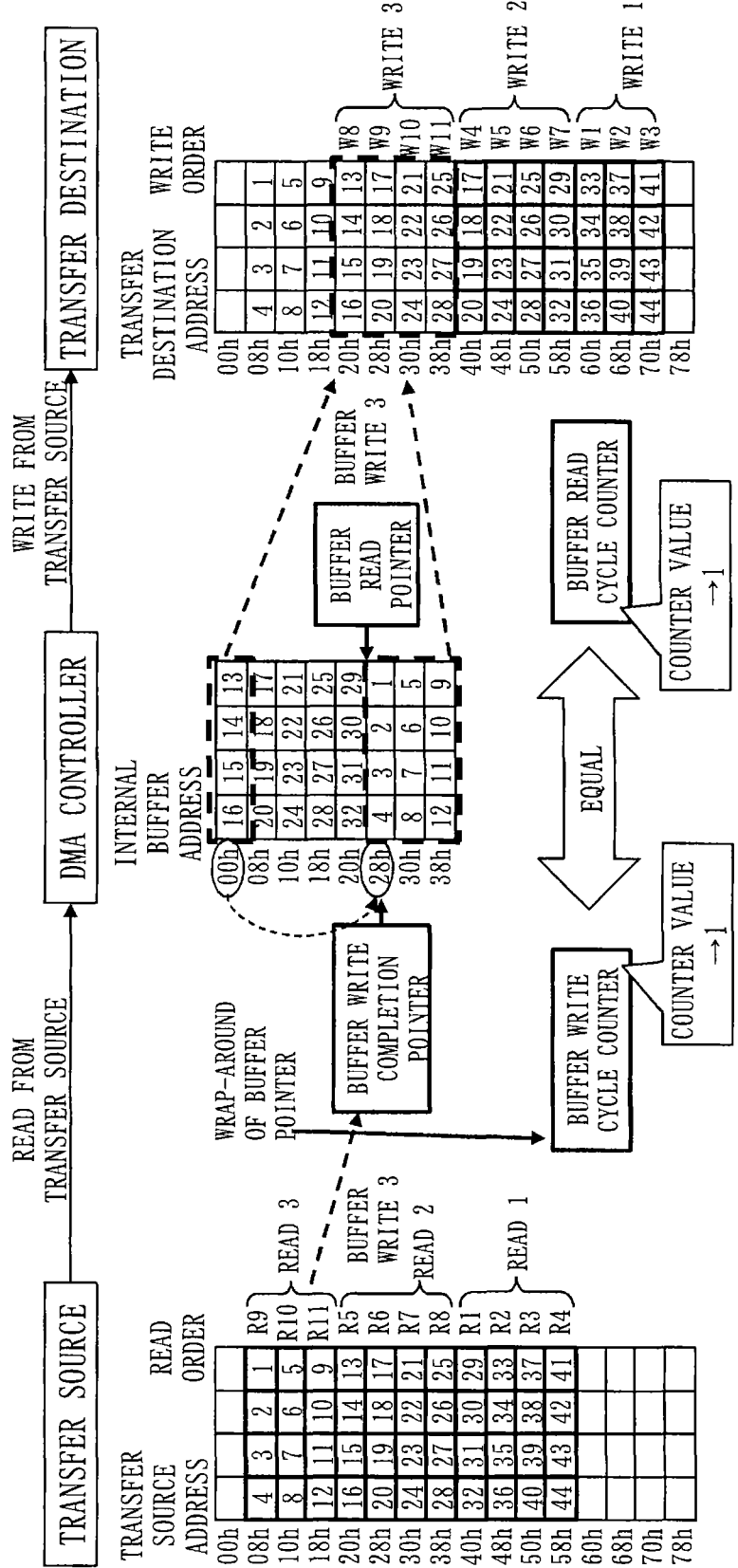
FIG. 25 is a diagram (2-4) showing a change in the data during the DMA transfer.

In a procedure 4 shown in FIG. 25, the operation specified by the buffer write 3 command is completed. Then, the buffer write control unit 120 updates the buffer write completion pointer to the address 28h. A wrap-around thereby occurs. The buffer write cycle counting unit 170 detects the wrap-around of the buffer write completion pointer and then counts up the buffer write cycle counter value by +1.

The data non-destructive control unit 160 detects that "the buffer write cycle counter value=the buffer read cycle counter value", and "the buffer write completion pointer value≤the buffer read pointer value", determines that the data preparation is completed, and then issues the transfer destination writable instruction. The buffer read control unit 140 issues a buffer read 3 command to a region of the internal buffer 130 at the addresses 28h to 00h to read the data to be written to the transfer destination, upon detection of the transfer destination writable instruction. The transfer destination write control unit 150 issues the write 3 (four-burst write) command to the region of the transfer destination at the addresses 20h to 38h.

Figure 26:
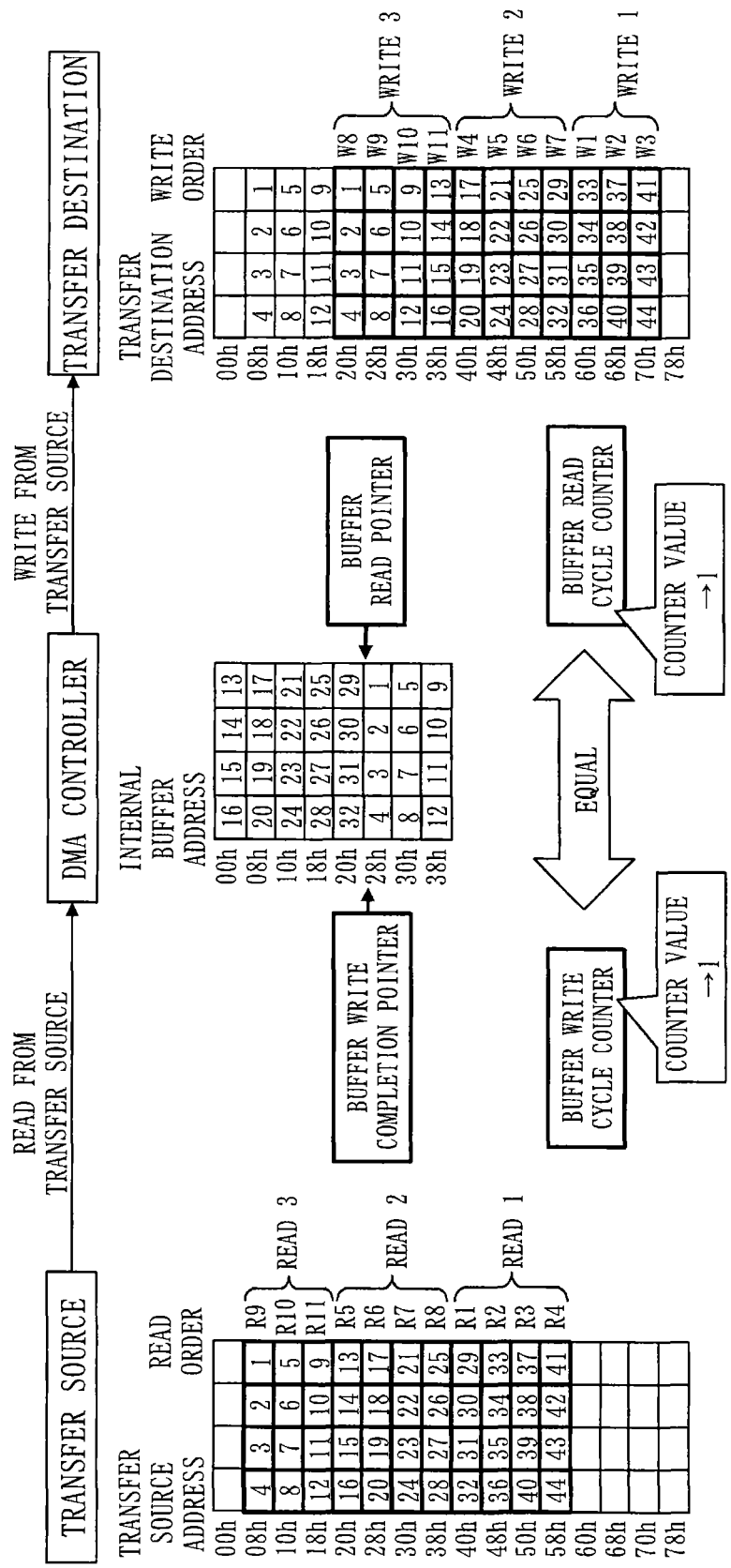
FIG. 26 is a diagram (2-5) showing a change in the data during the DMA transfer.

In a procedure 5 shown in FIG. 26, the DMA transfer result is shown. As shown in the transfer destination, the transfer of the data is completed, without occurrence of data destruction.

FIGS. 27 to 31 each show a diagram showing a change in data during a DMA transfer when the data of a size smaller than the size of the internal buffer 130 have been DMA-transferred, and none of the buffer write completion pointer and the buffer read pointer have wrapped around. That is, FIGS. 27 to 31 are each the diagram showing the change in the data when "the buffer write cycle counter value=the buffer read cycle counter value". Herein, a specific example where none of the buffer write completion pointer and the buffer read pointer have wrapped around is pointed out, for simplification. A similar effect, however, may be obtained even when the numbers of times of wrap-arounds of both of the buffer write completion pointer and the buffer read pointer are the same.

It is assumed in the example in each of FIGS. 27 to 31 that the size of the internal buffer 130 is 64 bytes of which two bytes are indicated by each cell. It is also assumed that a transfer source and a transfer destination in each of FIGS. 27 to 31 are a same device, and each cell of the transfer source and the transfer destination indicates two bytes.

In the example in each of FIGS. 27 to 31, the data in a region of the transfer source specified by addresses 00h to 30h are transferred to a region of the transfer destination specified by addresses 18h to 48h, by the decremental transfer. The DMA transfer control apparatus 100 issues to the transfer source a read 1 (three-burst read) command and a read 2 (four-burst read) command in this stated order. The DMA transfer control apparatus 100 issues to the transfer destination a write 1 (four-burst write) command and a write 2 (three-burst write) command in this stated order. When the address of a read destination and the address of a write destination each extend across a 32-byte boundary, a command for burst transfer of three bursts or less is issued for rounding.

Read orders shown on the right side of the transfer source in each of FIGS. 27 to 31 indicate orders in which the DMA transfer control apparatus 100 obtains the read data. The DMA transfer control apparatus 100 receives the read data in the order of R1 to R7, and writes the read data into the internal buffer 130 in the same order. Write orders shown on the right side of the transfer destination in each of FIGS. 27 to 31 indicate orders in which the DMA transfer control apparatus 100 outputs the data to the transfer destination. The DMA transfer control apparatus 100 receives the write data from the internal buffer 130 in the order of W1 to W7, and writes the data into the transfer destination in the same order.

The buffer write completion pointer in each of FIGS. 27 to 31 indicates a region of the internal buffer 130 where the data could be prepared, and the buffer read pointer indicates a region of the internal buffer 130 to be read. The buffer write cycle counter indicates the number of times of wrap-arounds of the buffer write completion pointer, and the buffer read cycle counter indicates the number of times of wrap-arounds of the buffer read pointer. Each of the pointers counts up by +1 for each wrap-around.

First, in step S11, the following setting information is set in the DMA transfer control apparatus 100:
transfer source address: 00h
transfer destination address: 30h
transfer size: 56 bytes
type of transfer: decremental transfer Next, in step S12, the decremental transfer is notified to each control unit and each counting unit by the data non-destructive control unit 160. Then, the procedure proceeds to step S14, where the DMA transfer is executed by the decremental transfer.

Figure 27:
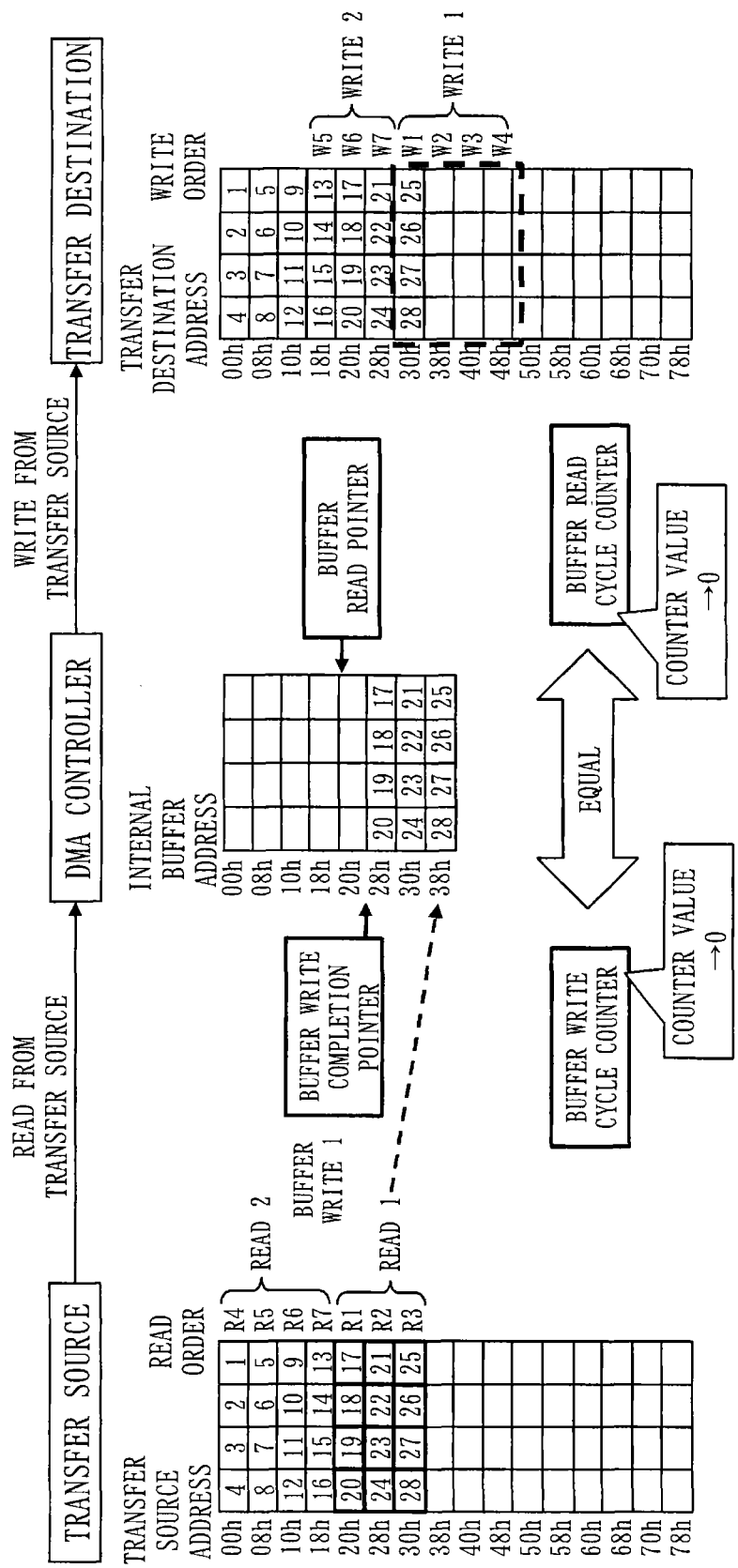
FIG. 27 is a diagram (3-1) showing a change in data during a DMA transfer.

In a procedure 1 shown in FIG. 27, the transfer source read control unit 110 issues the read 1 (three-burst read) command to the region of the transfer source at the addresses 20h to 30h. Upon receipt of the read data from the transfer source, the buffer write control unit 120 issues a buffer write 1 command corresponding to the read 1 command to the internal buffer 130 to write the read data into the region of the internal buffer 130 at the addresses 28h to 38h. When the operation specified by the buffer write 1 command is completed, the buffer write control unit 120 updates the buffer write completion pointer to the address 28h.

The buffer read control unit 140 sets the buffer read pointer to the read region (at the address 20h) of the data to be output according to the write 1 (four-burst write) command that will be issued to the transfer destination.

Figure 28:
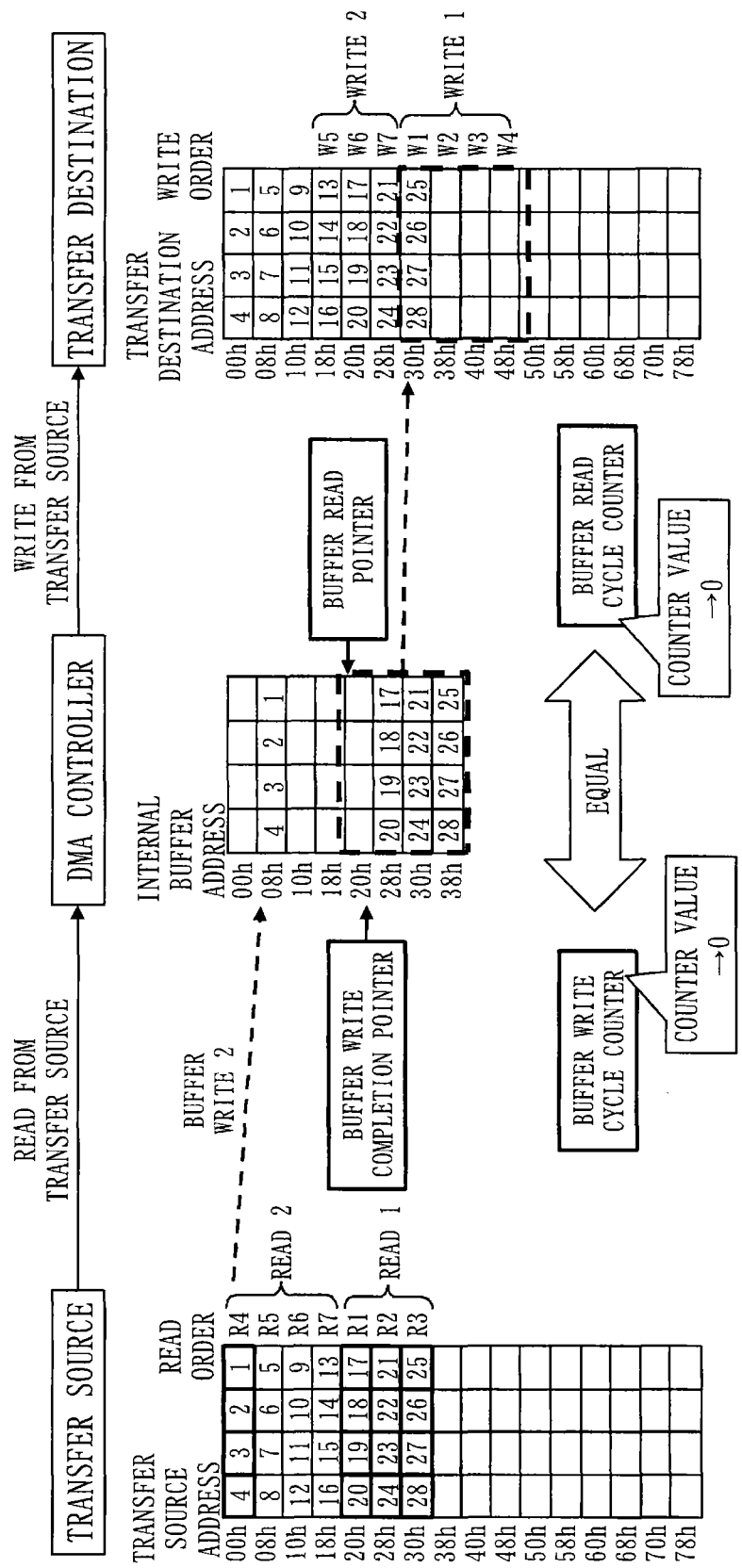
FIG. 28 is a diagram (3-2) showing a change in the data during the DMA transfer.

In a procedure 2 shown in FIG. 28, the transfer source read control unit 110 issues the read 2 (four-burst read) command to the region of the transfer source at the addresses 00h to 18h. Upon receipt of the read data from the transfer source, the buffer write control unit 120 issues to the internal buffer 130 a buffer write 2 command corresponding to the read 2 command to write the read data in the region of the internal buffer 130 at the addresses 08h to 20h. It is assumed herein that the operation specified by the buffer write 2 command is not completed and that the buffer write control unit 120 does not update the buffer write completion pointer.

The data non-destructive control unit 160 detects that "the buffer write cycle counter value=the buffer read cycle counter value", and "the buffer write completion pointer value>the buffer read pointer value", determines that data preparation is not completed, and does not therefore issue a transfer destination writable instruction. Since the buffer read control unit 140 does not detect the transfer destination writable instruction, the buffer read control unit 140 does not issue a buffer read 1 command. Similarly, the transfer destination write control unit 150 also does not issue the write 1 command. In the state of the procedure 2, it is determined that the data preparation has not been completed because a data amount (corresponding to four bursts) necessary for the subsequent write 1 command is present, but the necessary types of the data (data of 13 to 28) are not present.

Figure 29:
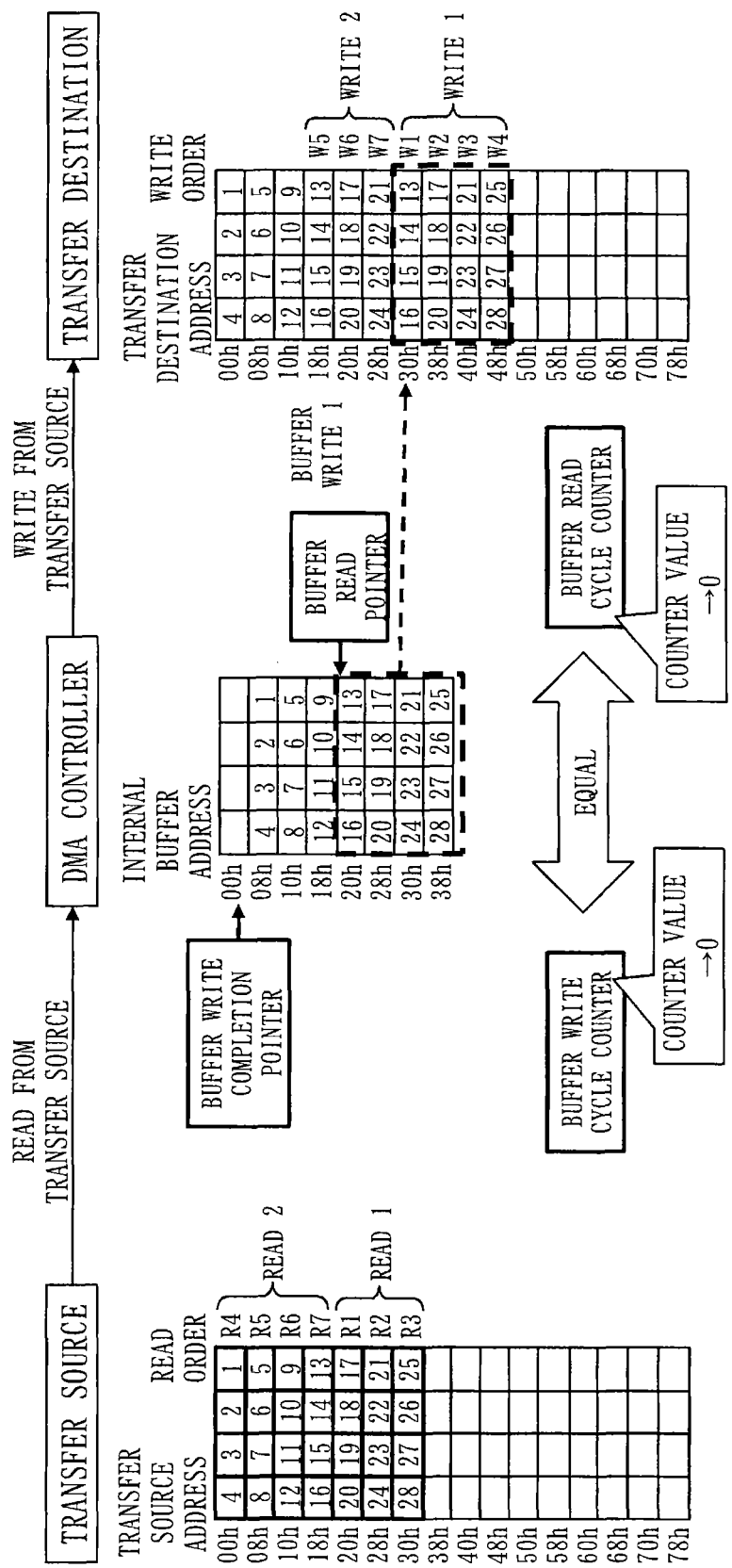
FIG. 29 is a diagram (3-3) showing a change in the data during the DMA transfer.

In a procedure 3 shown in FIG. 29, the operation specified by the buffer write 2 command is completed. Then, the buffer write control unit 120 updates the buffer write completion pointer to the address 08h.

The data non-destructive control unit 160 detects that "the buffer write cycle counter value=the buffer read cycle counter value", and "the buffer write completion pointer value≤the buffer read pointer value", determines that the data preparation is completed, and then issues the transfer destination writable instruction. Upon detection of the transfer destination writable instruction, the buffer read control unit 140 issues the buffer read 1 command to the region of the internal buffer 130 at the addresses 20h to 38h to read the data to be written to the transfer destination. The transfer destination write control unit 150 issues the write 1 (four-burst write) command to the region of the transfer destination at the addresses 30h to 48h.

Figure 30:
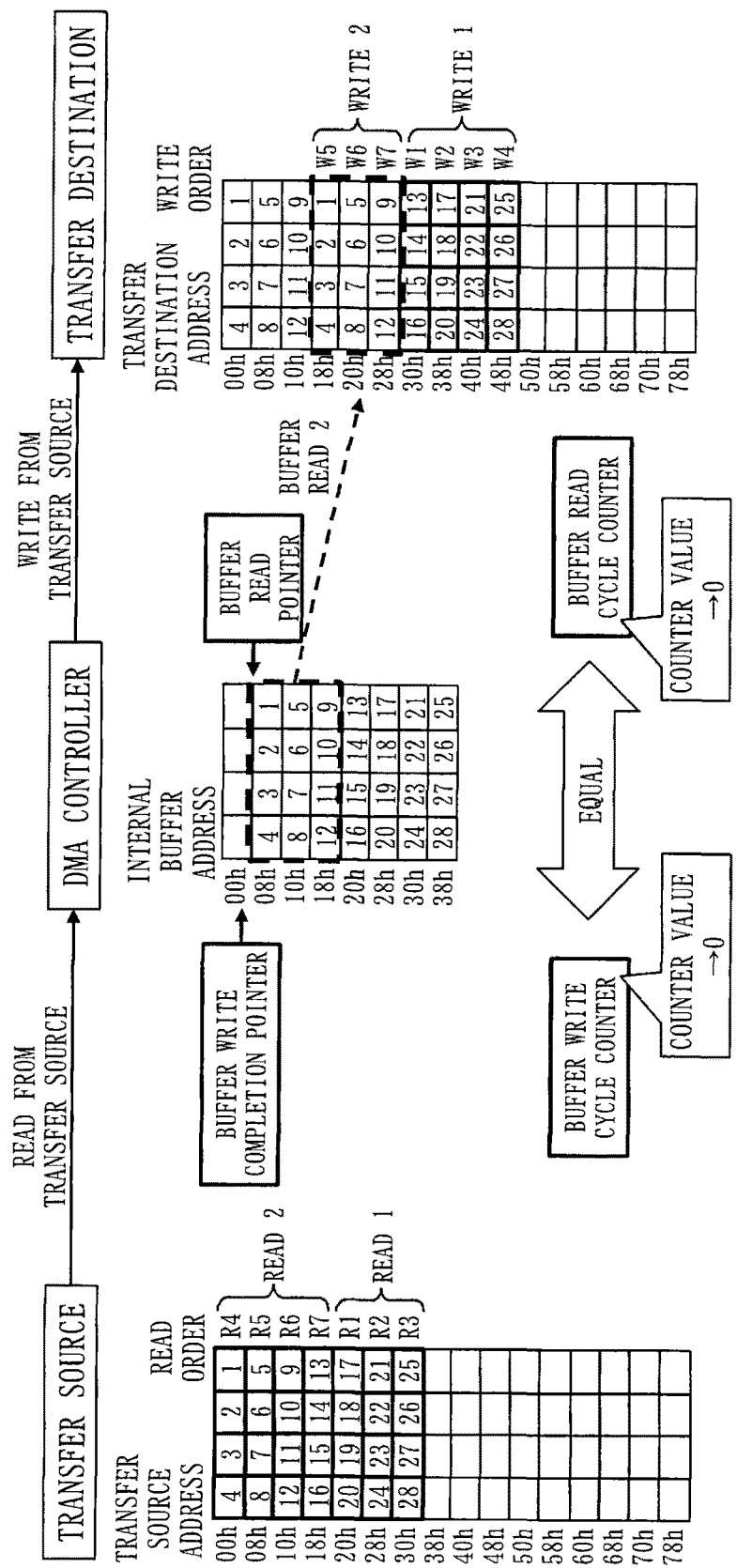
FIG. 30 is a diagram (3-4) showing a change in the data during the DMA transfer.

In a procedure 4 shown in FIG. 30, the buffer read control unit 140 updates the buffer read pointer to the address 08h when the operation specified by the buffer read 1 command is completed. The data non-destructive control unit 160 detects that "the buffer write cycle counter value=the buffer read cycle counter value", and "the buffer write completion pointer value≤the buffer read pointer value", determines that data preparation is completed, and then issues a transfer destination writable instruction. Upon detection of the transfer destination writable instruction, the buffer read control unit 140 issues a buffer read 2 command to a region of the internal buffer 130 at the addresses 08h to 18h to read the data to be written to the transfer destination. The transfer destination write control unit 150 issues the write 2 (three-burst write) command to the region of the transfer destination at the addresses 18h to 28h.

Figure 31:
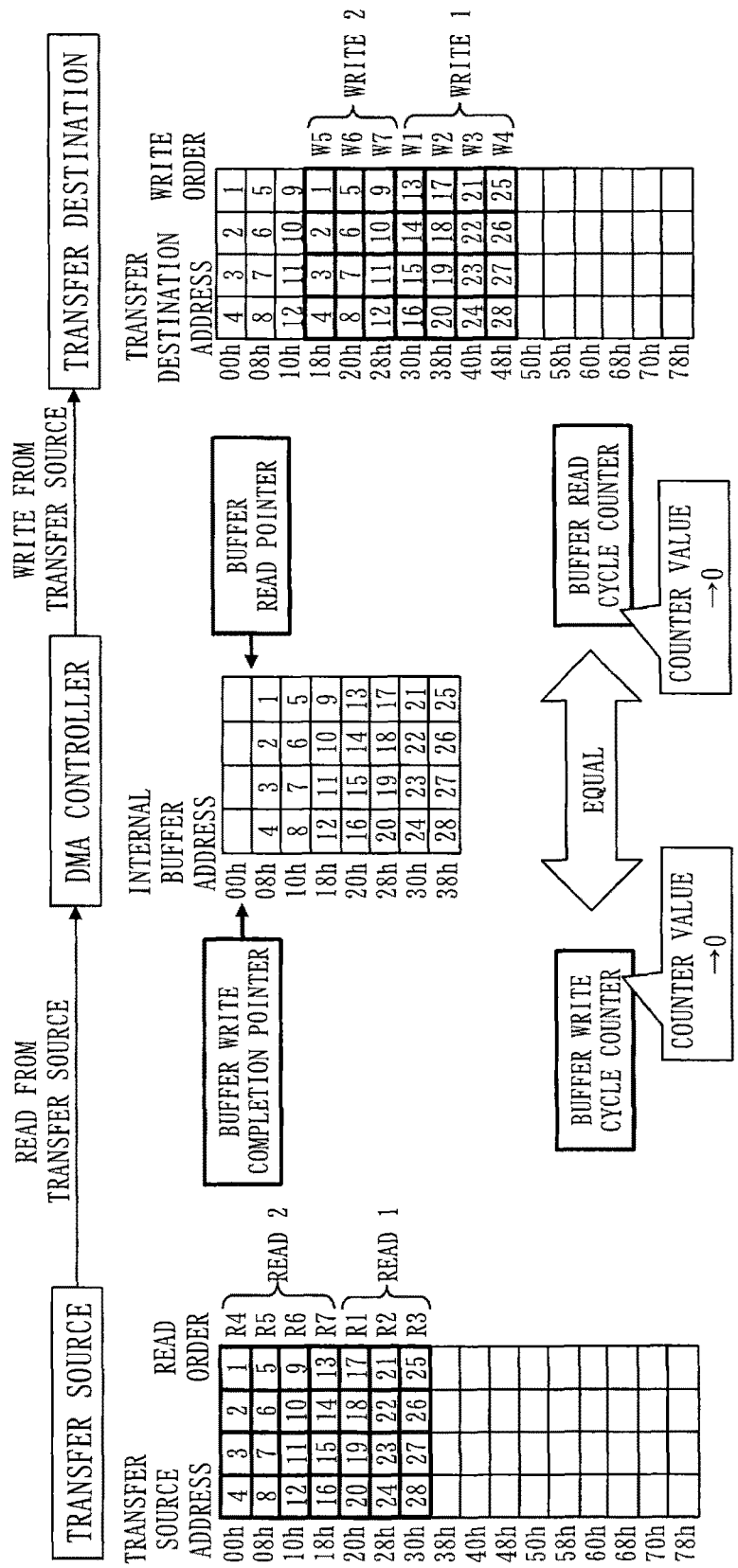
FIG. 31 is a diagram (3-5) showing a change in the data during the DMA transfer.

In a procedure 5 shown in FIG. 31, the DMA transfer result is shown. As shown in the transfer destination, the transfer of the data is completed, without occurrence of data destruction.

Second Embodiment

In the first embodiment, the CPU 200 specifies whether to perform the incremental transfer or the decremental transfer. That is, it is necessary to determine whether to perform the incremental transfer or the decremental transfer by the CPU 200.

In a second embodiment, a description will be made about a method whereby the DMA transfer control apparatus 100 appropriately determines whether to perform the incremental transfer or the decremental transfer according to a state of overlapping between a transfer source region and a transfer destination region.

The DMA transfer control apparatus 100 according to the second embodiment is different from the DMA transfer control apparatus 100 according to the first embodiment only in a configuration of the data non-destructive control unit 160.

Figure 32:
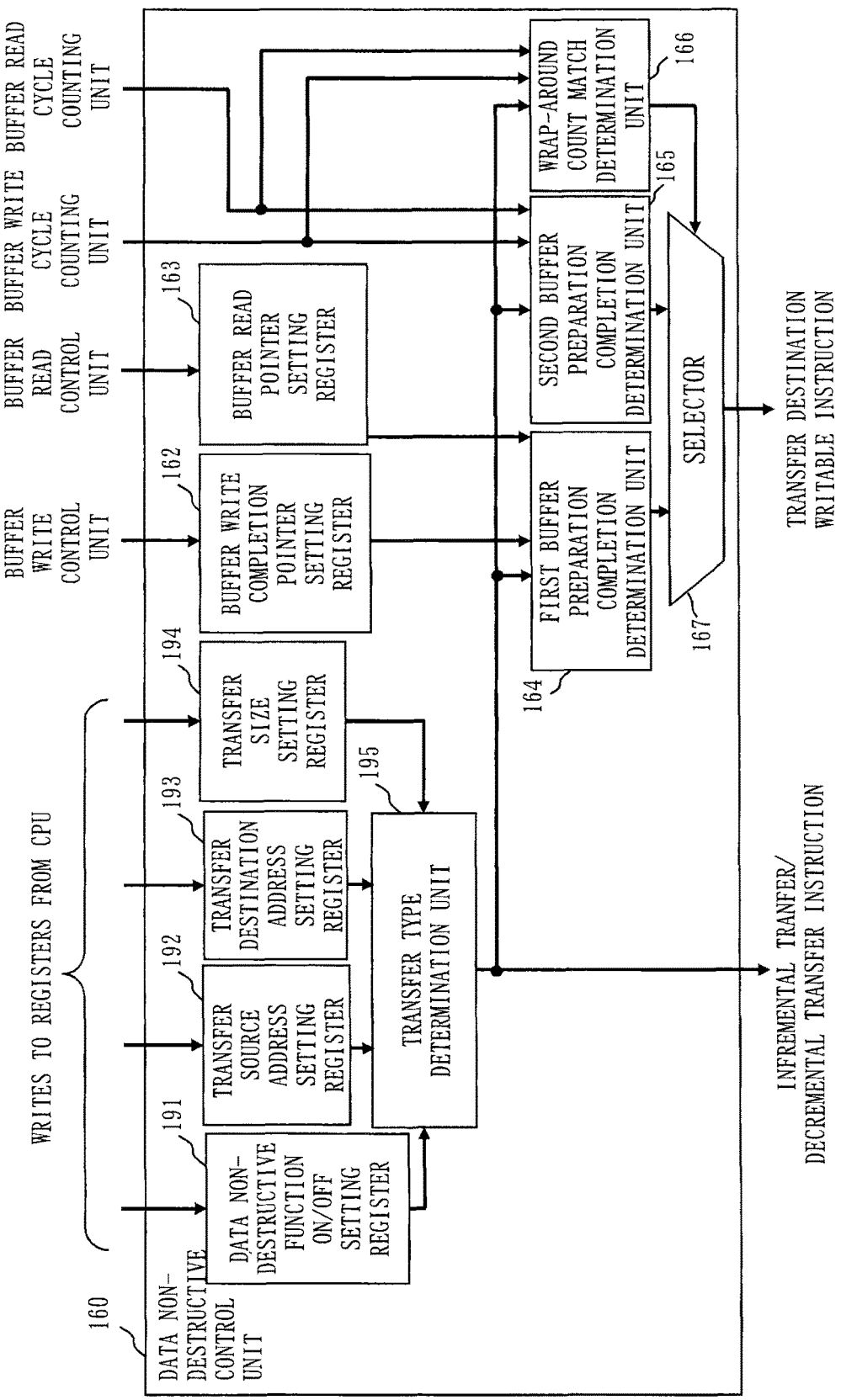
FIG. 32 is a diagram showing a configuration of the data non-destructive control unit 160 according to a second embodiment.

FIG. 32 is a diagram showing the configuration of the data non-destructive control unit 160 according to the second embodiment. The data non-destructive control unit 160 according to the second embodiment does not include the transfer type setting register 161 included by the data non-destructive control unit 160 according to the first embodiment. In place of the transfer type setting register 161, the data non-destructive control unit 160 according to the second embodiment includes a data non-destructive function ON/OFF setting register 191, a transfer source address setting register 192, a transfer destination address setting register 193, a transfer size setting register 194, and a transfer type determination unit 195.

It is set in the data non-destructive function ON/OFF setting register 191 whether a data non-destructive function is to be ON (effective) or OFF (ineffective).

A start address for the transfer source region is set in the transfer source address setting register 192. A start address for the transfer destination region is set in the transfer destination address setting register 193. The size of transfer data is set in the transfer size setting register 194.

When the data non-destructive function is set to be ON in the data non-destructive function ON/OFF setting register 191, the transfer type determination unit 195 determines the type of transfer as follows, and notifies each control unit of the type of transfer:

(A) when the transfer source region and the transfer destination region do not overlap with each other, the transfer type determination unit 195 determines the type of transfer to be the incremental transfer.

(B) when the transfer source region and the transfer destination region overlap with each other, the transfer type determination unit 195 determines the type of transfer, according to the following criteria (a) to (c):

(a) when the transfer source region and the transfer destination region are completely the same region, the transfer type determination unit 195 determines the type of transfer to be the incremental transfer.

(b) when the address value of the address (start address for the transfer source region) set in the transfer source address setting register 192 is smaller than the address value of the address (start address for the transfer destination region) set in the transfer destination address setting register 193, the transfer type determination unit 195 determines the type of transfer to be the decremental transfer.

(c) when the address value of the address (start address for the transfer source region) set in the transfer source address setting register 192 is larger than the address value of the address (start address for the transfer destination region) set in the transfer destination address setting register 193, the transfer type determination unit 195 determines the type of transfer to be the incremental transfer.

On the other hand, when the data non-destructive function is set to be OFF in the data non-destructive function ON/OFF setting register 191, the transfer type determination unit 195 constantly notifies each control unit of the incremental transfer.

Figure 33:
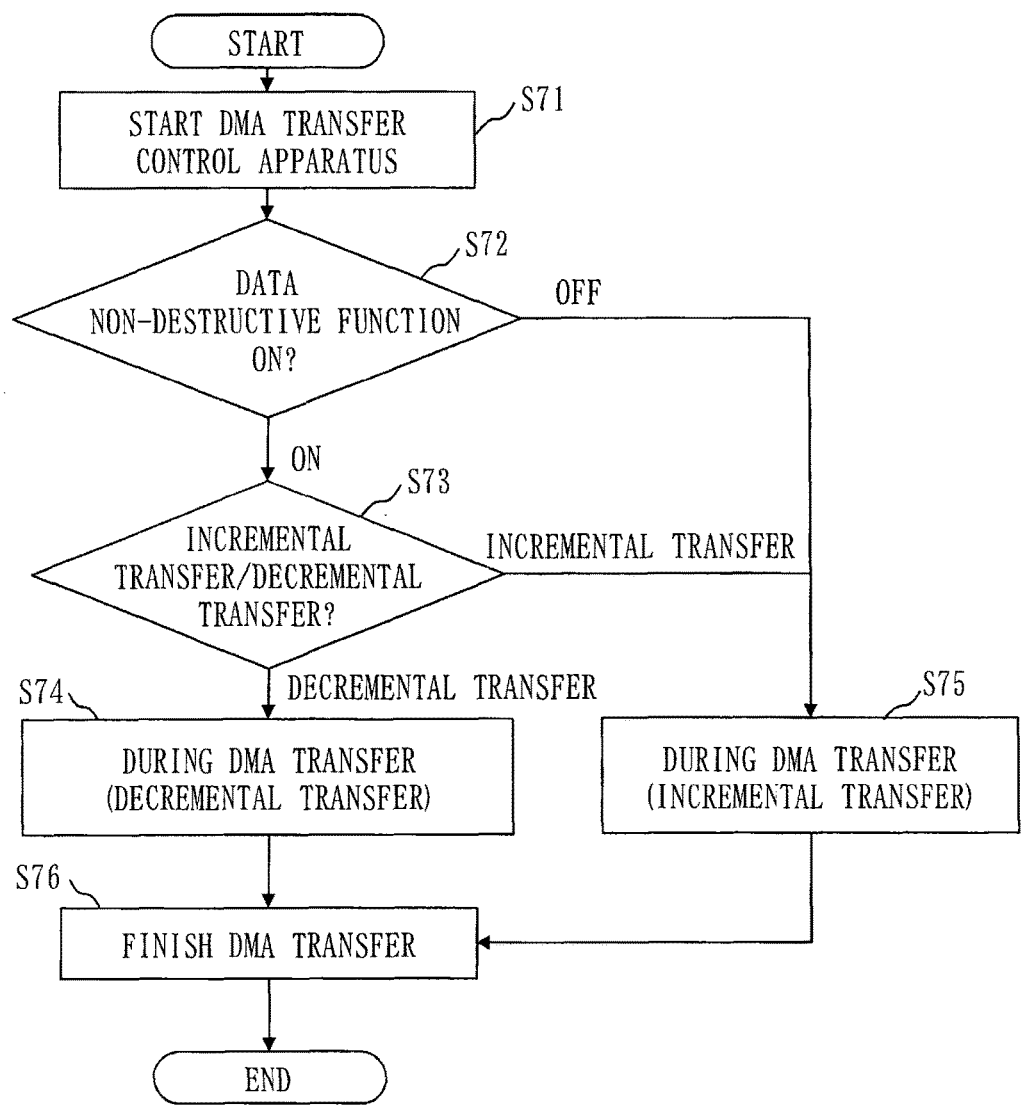
FIG. 33 is a flowchart showing operations of the whole DMA transfer control apparatus 100 according to the second embodiment.

FIG. 33 is a flowchart showing operations of the overall DMA transfer control apparatus 100 according to the second embodiment.

Step S71 is the same as step S11 in FIG. 9. In this step, it is also set in the register whether the data non-destructive function is set to be ON or OFF.

In step S72, the data non-destructive control unit 160 determines whether the setting in the register (data non-destructive function ON/OFF setting register 191) is set to be ON or OFF. When it is determined that the setting is set to be ON, the DMA transfer control apparatus 100 causes the procedure to proceed to step S73. When it is determined that the setting is set to be OFF, the DMA transfer control apparatus 100 notifies each control unit that the type of transfer is the incremental transfer and causes the procedure to proceed to step S75.

In step S73, the data non-destructive control unit 160 determines whether the incremental transfer or the decremental transfer is to be performed. When it is determined that the decremental transfer is to be performed, the DMA transfer control apparatus 100 notifies each control unit of the decremental transfer and causes the procedure to proceed to step S74. On the other hand, when it is determined that the incremental transfer is to be performed, the DMA transfer control apparatus 100 notifies each control unit of the incremental transfer and causes the procedure to proceed to step S75.

In step S74, the DMA transfer control apparatus 100 performs the decremental transfer with respect to the memory 300. On the other hand, in step S75, the DMA transfer control apparatus 100 performs the incremental transfer to with respect to the memory 300.

Then, in step S76, the transfer operation is stopped when there is a DMA transfer stop factor such as completion of transfer of data having a data length specified by the DMA transfer control apparatus 100.

As described above, according to the DMA transfer control apparatus 100 in the second embodiment, the data transfer may be performed after the DMA transfer control apparatus 100 has determined the appropriate type of transfer, with the type of transfer not specified by the CPU 200.

In the above description, each control unit is formed of a circuit or the like, for example. Thus, a "~unit" may be interpreted as a "~circuit".

REFERENCE SIGNS LIST

10: DMA transfer system
100: DMA transfer control apparatus
110: transfer source read control unit
120: buffer write control unit
130: internal buffer
140: buffer read control unit
150: transfer destination write control unit
160: data non-destructive control unit
161: transfer type setting register
162: buffer write completion pointer setting register
163: buffer read pointer setting register
164: first buffer preparation completion determination unit
165: second buffer preparation completion determination unit
166: wrap-around count match determination unit
167: selector
170: buffer write cycle counting unit
171: wrap-around detection unit
172: wrap-around count counting unit
180: buffer read cycle counting unit
181: wrap-around detection unit
182: wrap-around count counting unit
191: data non-destructive function ON/OFF setting register
192: transfer source address setting register
193: transfer destination address setting register
194: transfer size setting register
195: transfer type determination unit
200: CPU
300: memory

The invention claimed is:

1. A data transfer apparatus that burst-transfers data stored in a transfer source region of a memory to a transfer destination region of the memory, the data transfer apparatus comprising:

a buffer write control unit that obtains the data stored in the transfer source region of the memory and writes the data into a ring buffer;
a buffer read control unit that reads the data written by the buffer write control unit from the ring buffer;
a transfer destination write control unit that writes the data read by the buffer read control unit into the transfer destination region of the memory, the transfer destination control unit generating a burst write command for writing the data in an ascending direction into respective divided regions of the memory obtained by dividing the transfer destination region of the memory, when the transfer source region and the transfer destination region of the memory overlap with each other, and executing decremental transfer of writing for each of the divided regions of the memory in a descending order of start addresses for the divided regions of the memory when the transfer source region and the transfer destination region of the memory overlap in the ascending direction of addresses; and
a data non-destructive control unit that determines whether or not to permit writing of the data to the transfer destination region of the memory, based on a magnitude relation between a number of times of wraparounds by the buffer write control unit and a number of times of wraparounds by the buffer read control unit when the transfer destination write control unit executes the decremental transfer;
wherein when the data non-destructive control unit determines to permit writing, the transfer destination write control unit outputs the burst write command for the decremental transfer.

2. The data transfer apparatus according to claim 1, wherein the data non-destructive control unit determines whether or not to permit writing of the data into the transfer destination region, further based on a magnitude relation between a value of an address at the ring buffer where the buffer write control unit has completed writing of the data and a value of an address at the ring buffer from which the buffer read control unit is to read the data.

3. The data transfer apparatus according to claim 2, wherein the data transfer apparatus further comprises:

a transfer source read control unit that generates a plurality of read commands such that address values of read start addresses of the plurality of read commands are arranged in a descending order and sequentially outputs the plurality of read commands, each read command instructing sequentially reading each unit amount of the data in an ascending order of address values starting at a read start address until reaching a predetermined number of unit amounts of the data;
wherein the buffer write control unit obtains each unit amount of the data read by each read command output by the transfer source read control unit in an order where the transfer source read control unit has output the read command, and writes the predetermined number of unit amounts of the data into the ring buffer in an ascending order of address values of the ring buffer starting at an address at the ring buffer corresponding to the read start address of the read command, and sets a write completion pointer at the address at the ring buffer corresponding to the read start address when writing of the data read by the read command into the ring buffer is finished;
wherein the transfer destination write control unit generates a plurality of write commands such that address values of write start addresses of the plurality of write commands are arranged in a descending order and sequentially outputs the plurality of write commands, each write command instructing sequentially writing each unit amount of the data in an ascending order of address values starting at a write start address until reaching a predetermined number of unit amounts of the data;

wherein the buffer read control unit sets a read pointer at an address at the ring buffer corresponding to the write start address of the write command to be output subsequently to the read command by the transfer destination write control unit;

wherein the data non-destructive control unit determines to permit writing when the number of times of wrap-arounds by the buffer write control unit is larger than the number of times of wraparounds by the buffer read control unit and when the number of times of wrap-arounds by the buffer write control unit is equal to the number of times of wraparounds by the buffer read control unit and an address value of the address where the read pointer has been set is equal to or larger than an address value of the address where the write completion pointer has been set;

wherein when the data non-destructive control unit determines to permit writing, the buffer read control unit reads each unit amount of the data in the ascending order of the address values starting at the address where the read pointer has been set; and wherein the transfer destination write control unit outputs the subsequent write command when the data non-destructive control unit determines to permit writing.

4. The data transfer apparatus according to claim 3,
wherein the data non-destructive control unit determines to perform decremental transfer when the transfer source region and the transfer destination region overlap with each other in the ascending direction of the addresses and when otherwise, the data non-destructive control unit determines to perform incremental transfer;

wherein when the data non-destructive control unit determines to perform the decremental transfer, the transfer source read control unit generates the plurality of read commands such that the address values of the read start addresses of the plurality of read commands are arranged in the descending order and sequentially outputs the plurality of read commands, and when the data non-destructive control unit determines to perform the incremental transfer, the transfer source read control unit generates the plurality of read commands such that the address values of the read start addresses of the plurality of read commands are arranged in the ascending order and sequentially outputs the plurality of read commands;

wherein when the data non-destructive control unit determines to perform the decremental transfer, the transfer destination write control unit generates the plurality of write commands such that the address values of the write start addresses of the plurality of write commands are arranged in the descending order and sequentially outputs the plurality of write commands, and when the data non-destructive control unit determines to perform the incremental transfer, the transfer destination write control unit generates the plurality of write commands such that the address values of the write start addresses of the plurality of write commands are arranged in the ascending order and sequentially outputs the plurality of write commands; and wherein when the data non-destructive control unit determines to perform the decremental transfer, the data non-destructive control unit determines to permit writing when the number of times of wrap-arounds by the buffer write control unit is larger than the number of times of wrap-arounds by the buffer read control unit and when the number of times of wrap-arounds by the buffer write control unit is equal to the number of times of wrap-arounds by the buffer read control unit and the address value of the address where the read pointer has been set is equal to or larger than the address value of the address where the write completion pointer has been set, and when the data non-destructive control unit determines to perform the incremental transfer, the data non-destructive control unit determines to permit writing irrespective of the addresses where the read pointer and the write completion pointer have been set.

5. The data transfer apparatus according to claim 1,
wherein the buffer write control unit obtains the data read by the read command through a read bus; and
wherein the buffer read control unit transmits the data read from the ring buffer to the transfer destination region through a write bus different from the read bus.

6. A data transfer method of burst-transferring data stored in a transfer source region of a memory to a transfer destination region of the memory, the data transfer method comprising:
a buffer write control step of obtaining the data stored in the transfer source region of the memory and writing the data into a ring buffer;
a buffer read control step of reading from the ring buffer the data written in the buffer write control step;
a transfer destination write control step of writing the data read in the buffer read control step into the transfer destination region of the memory, the transfer destination write control step comprising generating a burst write command for writing the data in an ascending direction into respective divided regions of the memory obtained by dividing the transfer destination region of the memory, when the transfer source region and the transfer destination region of the memory overlap with each other, and executing decremental transfer of writing for each of the divided regions of the memory in a descending order of start addresses for the divided regions of the memory when the transfer source region and the transfer destination region of the memory overlap in the ascending direction of addresses; and
a data non-destructive control step of determining whether or not to permit writing of the data into the transfer destination region of the memory, based on a magnitude relation between a number of times of wrap-arounds in the buffer write control step and a number of times of wrap-arounds in the buffer read control step when the decremental transfer is executed in the transfer destination write control step;
wherein in the transfer destination write control step, when writing is determined to be permitted in the data non-destructive control step, the burst write command for the decremental transfer is output.

7. A non-transitory computer readable medium including a data transfer program for burst-transferring data stored in a transfer source region of a memory to a transfer destination region of the memory, the data transfer program causing a computer to execute:

a buffer write control process of obtaining the data stored in the transfer source region of the memory and writing the data into a ring buffer;

a buffer read control process of reading the data written in the buffer write control process from the ring buffer;

a transfer destination write control process of writing the data read in the buffer read control process into the transfer destination region of the memory, the transfer destination write control process comprising generating a burst write command for writing the data in an ascending direction into respective divided regions of the memory obtained by dividing the transfer destination region of the memory, when the transfer source region and the transfer destination region of the memory overlap with each other, and executing decremental transfer of writing for each of the divided regions of the memory in a descending order of start addresses for the divided regions of the memory when the transfer source region and the transfer destination region of the memory overlap in the ascending direction of addresses; and a data non-destructive control process of determining whether or not to permit writing of the data into the transfer destination region of the memory, based on a magnitude relation between a number of times of wrap-arounds in the buffer write control process and a number of times of wrap-arounds in the buffer read control process when the decremental transfer is executed in the transfer destination write control process;

wherein in the transfer destination write control process, when writing is determined to be permitted in the data non-destructive control process, the burst write command for the decremental transfer is output.

* * * * *